US012783211B2

(12) United States Patent
Li

(10) Patent No.: US 12,783,211 B2
(45) Date of Patent: Nov. 3, 2026

(54) CHIP, TERMINAL, FLOATING-POINT OPERATION CONTROL METHOD, AND RELATED APPARATUS

(71) Applicant: Tencent Technology (Shenzhen) Company Limited, Shenzhen (CN)

(72) Inventor: Jiaxin Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 1102 days.

(21) Appl. No.: 17/898,461

(22) Filed: Aug. 29, 2022

(65) Prior Publication Data

US 2023/0108799 A1 Apr. 6, 2023

Related U.S. Application Data

(63) Continuation of application No. PCT/CN2021/101378, filed on Jun. 22, 2021.

(30) Foreign Application Priority Data

Aug. 4, 2020 (CN) ......................... 202010774707.3

(51) Int. Cl.
*G06F 7/487* (2006.01)
*G06F 7/544* (2006.01)

(52) U.S. Cl.
CPC .......... *G06F 7/4876* (2013.01); *G06F 7/5443* (2013.01)

(58) Field of Classification Search
CPC ....... G06F 7/4876; G06F 7/483; G06F 7/5443
See application file for complete search history.

(56) References Cited

U.S. PATENT DOCUMENTS 6,480,872 B1 11/2002 Choquette
10,747,502 B2 * 8/2020 Pareek .................. G06F 9/3001
(Continued)

FOREIGN PATENT DOCUMENTS

CN 104572010 A 4/2015
CN 109739555 A 5/2019
CN 111767025 A 10/2020

OTHER PUBLICATIONS

Na, T. "Speeding up Convolutional Neural Network Training with Dynamic Precision Scaling and Flexible Multiplier-Accumulator" (https://dl.acm.org/doi/pdf/10.1145/2934583.2934625) (Year: 2016).*
(Continued)

*Primary Examiner* — Emily E Larocque
*Assistant Examiner* — Carlos Heberto De La Garza
(74) *Attorney, Agent, or Firm* — ArentFox Schiff LLP

(57) ABSTRACT

A floating-point operation control method, applied to a chip comprising a multiply accumulator, includes receiving a first selection signal, and controlling an operation circuit in the multiply accumulator corresponding to a floating-point operation mode indicated by the first selection signal. The floating-point operation mode supports a multiply accumulate operation of a floating-point number of a first bit width $k_1$. The method further includes dividing fractional parts of first and second operands into m first and second suboperands of a second bit width $k_2$. The second bit width $k_2=k_1/m$. The method further includes performing a multiplication operation based on the m first and second suboperands to obtain a fractional product, and determining a floating-point number sum based on the fractional product and a third operand.

20 Claims, 15 Drawing Sheets

(56) References Cited

U.S. PATENT DOCUMENTS

| | | | | |
|---|---|---|---|---|
| 2019/0324723 | A1* | 10/2019 | Garegrat | G06F 17/16 |
| 2019/0339937 | A1 | 11/2019 | Lo et al. | |
| 2021/0182024 | A1* | 6/2021 | Mueller | G06N 3/063 |
| 2022/0019642 | A1* | 1/2022 | Craske | G06F 7/5443 |

OTHER PUBLICATIONS

Zhang, H. "New Flexible Multiple-Precision Multiply-Accumulate Unit for Deep Neural Network Training and Inference" (https://ieeexplore.ieee.org/stamp/stamp.jsp?tp=&arnumber=8825551) (Year: 2020).*

International Search Report and Written Opinion issued Sep. 24, 2021 in International Application No. PCT/CN2021/101378 with English Translation (9 pages).

Chinese Office Action issued Aug. 24, 2023 in Application No. 202010774707.3 with English Translation (35 pages).

* cited by examiner m=2

| | Level 4 | Level 3 | Level 2 | Level 1 |
|---|---|---|---|---|
| Quantity of addition suboperands (carrying not considered) | 1 | 3 | 3 | 1 |
| Quantity of addition suboperands (previous-level carrying considered) | 1 | 3 | 4 | 3 |
| Quantity of adders of a half adder structure (previous-level carrying considered) | 0 | 2 | 3 | 2 |
| Quantity of adders of a full adder structure (previous-level carrying considered) | 0 | 1 | 2 | 1 |

m=4

| | Level 8 | Level 7 | Level 6 | Level 5 | Level 4 | Level 3 | Level 2 | Level 1 |
|---|---|---|---|---|---|---|---|---|
| Quantity of addition suboperands (carrying not considered) | 1 | 3 | 5 | 7 | 7 | 5 | 3 | 1 |
| Quantity of addition suboperands (previous-level carrying considered) | 1 | 3 | 6 | 10 | 12 | 11 | 8 | 5 |
| Quantity of adders of a half adder structure (previous-level carrying considered) | 0 | 2 | 5 | 9 | 11 | 10 | 7 | 4 |
| Quantity of adders of a full adder structure (previous-level carrying considered) | 0 | 1 | 3 | 5 | 6 | 5 | 4 | 2 |

CHIP, TERMINAL, FLOATING-POINT OPERATION CONTROL METHOD, AND RELATED APPARATUS

RELATED APPLICATIONS

This application is a continuation of International Application No. PCT/CN2021/101378, filed on Jun. 22, 2021, which claims priority to Chinese Patent Application No. 202010774707.3, entitled "CHIP INCLUDING MULTIPLY ACCUMULATOR, TERMINAL, FLOATING-POINT OPERATION CONTROL METHOD" filed on Aug. 4, 2020. The entire disclosures of the prior applications are hereby incorporated by reference.

FIELD OF THE TECHNOLOGY

This application relates to the chip field, including floating-point operation control.

BACKGROUND OF THE DISCLOSURE

A multiply accumulator used for floating-point operation is used as a basic operation unit, and is a core component on a chip such as a graphics processing unit (GPU), an artificial intelligence (AI) chip, a central processing unit (CPU), a field-programmable gate array (FPGA), or an application specific integrated circuit (ASIC).

Different hardware structures need to be used for floating-point operation with bit widths of FP16, FP32, and FP64. For example, FP64 floating-point operation uses a set of hardware structure, FP16 floating-point operation and FP32 floating-point operation use a set of hardware structure, and the two sets of hardware structures are mutually independent. Even though FP16 floating-point operation and FP32 floating-point operation use one set of hardware structure, an operation bit width used when FP16 floating-point operation performs a multiplication operation of a fractional part is 16 bits, and an operation bit width used when FP32 floating-point operation performs a multiplication operation of a fractional part is 32 bits.

SUMMARY

Embodiments of this disclosure provide a chip, a terminal, a floating-point operation control method, and a related apparatus. A floating-point number of a high bit width is split into operands of low bit widths to perform a multiply accumulate operation, so that a single hardware structure can support multiply accumulate operations of floating-point numbers of a plurality of bit widths, and it is unnecessary to integrate at least two sets of hardware structures or integrate many operation units on the chip to support multiply accumulate operations of floating-point numbers of a plurality of bit widths, thereby effectively reducing an area of the chip and reducing power consumption during running of the chip. The technical solutions are as follows.

In an embodiment, a chip includes a multiply accumulator, the multiply accumulator including an input configured to receive a floating-point number, a first selection input, a floating-point general-purpose processing circuitry, and an output circuitry. The floating-point general-purpose processing circuitry is separately connected to the input configured to receive the floating-point number and the first selection input. An output of the floating-point general-purpose processing circuitry is connected to an input of the output circuitry. The floating-point general-purpose processing circuitry is configured to receive a first operand, a second operand, and a third operand. Each of the first operand, the second operand, and the third operand has a first bit width $k_1$ and are inputted at the input configured to receive the floating-point number. The floating-point general-purpose processing circuitry is further configured to divide a fractional part of the first operand into m first suboperands of a second bit width $k_2$ according to a floating-point operation mode indicated by the first selection input, and divide a fractional part of the second operand into m second suboperands of the second bit width $k_2$. The second bit width $k_2=k_1/m$, and m is a positive integer. The floating-point general-purpose processing circuitry is further configured to perform a multiplication operation of fractional parts based on the m first suboperands and the m second suboperands to obtain a fractional product, and determine a floating-point number product of the first operand and the second operand based on a sign bit and an exponent part of the first operand, a sign bit and an exponent part of the second operand, and the fractional product. The floating-point general-purpose processing circuitry is further configured to perform an addition operation on the floating-point number product and the third operand to obtain a floating-point number. The output circuitry is configured to output an operation result in a specified data format according to the floating-point number sum.

In an embodiment, a floating-point operation control method is applied to a chip comprising a multiply accumulator. The method includes receiving a first selection signal, and controlling an operation circuit in the multiply accumulator to be an operation circuit corresponding to a floating-point operation mode indicated by the first selection signal. The floating-point operation mode supports a multiply accumulate operation of a floating-point number of a first bit width $k_1$, The method further includes receiving a first operand, a second operand, and a third operand, each of the first operand, the second operand, and the third operand having the first bit width $k_1$. The method further includes dividing a fractional part of the first operand into m first suboperands of a second bit width $k_2$, and dividing a fractional part of the second operand into m second suboperands of the second bit width $k_2$, the second bit width $k_2=k_1/m$, and m being a positive integer. The method further includes performing a multiplication operation of fractional parts based on the m first suboperands and the m second suboperands to obtain a fractional product, and determining a floating-point number product of the first operand and the second operand based on a sign bit and an exponent part of the first operand, a sign bit and an exponent part of the second operand, and the fractional product. The method further includes performing an addition operation on the floating-point number product and the third operand to obtain a floating-point number sum, and outputting an operation result in a specified data format according to the floating-point number sum.

In an embodiment, a non-transitory computer-readable storage medium stores computer-readable instructions thereon, which, when executed by a chip comprising a multiply accumulator, cause the chip to perform a floating-point operation control method. The method includes receiving a first selection signal, and controlling an operation circuit in the multiply accumulator to be an operation circuit corresponding to a floating-point operation mode indicated by the first selection signal. The floating-point operation mode supports a multiply accumulate operation of a floating-point number of a first bit width $k_1$, The method further includes receiving a first operand, a second operand, and a third operand, each of the first operand, the second operand, and the third operand having the first bit width $k_1$. The method further includes dividing a fractional part of the first operand into m first suboperands of a second bit width $k_2$, and dividing a fractional part of the second operand into m second suboperands of the second bit width $k_2$, the second bit width $k_2=k_1/m$, and m being a positive integer. The method further includes performing a multiplication operation of fractional parts based on the m first suboperands and the m second suboperands to obtain a fractional product, and determining a floating-point number product of the first operand and the second operand based on a sign bit and an exponent part of the first operand, a sign bit and an exponent part of the second operand, and the fractional product. The method further includes performing an addition operation on the floating-point number product and the third operand to obtain a floating-point number sum, and outputting an operation result in a specified data format according to the floating-point number sum.

The floating-point general-purpose unit (floating-point general-purpose processing circuitry) is arranged in the multiply accumulator on the chip. In different floating-point operation modes, the floating-point general-purpose unit may split a floating-point number of a high bit width into suboperands of low bit widths to perform a multiply accumulate operation. Floating-point numbers of different high bit widths may be split into different quantities of suboperands of low bit widths. Correspondingly, the floating-point general-purpose unit controls, according to selection of a floating-point operation mode, a multiplier and an adder in the multiply accumulator to perform splitting and reassembly, and an operation circuit in the multiply accumulator becomes an operation circuit corresponding to the floating-point operation mode so as to perform a multiply accumulate operation, so that the operation circuit can support a multiply accumulate operation of floating-point numbers of different bit widths, and there is no need to integrate at least two hardware structures on the chip to support the multiply accumulate operation of floating-point numbers of different bit widths. In addition, the multiplier and the adder can be reused, and a quantity of multipliers and adders arranged can be reduced, thereby effectively reducing an area of the chip and reducing power consumption during running of the chip.

DESCRIPTION OF EMBODIMENTS

Figure 1:
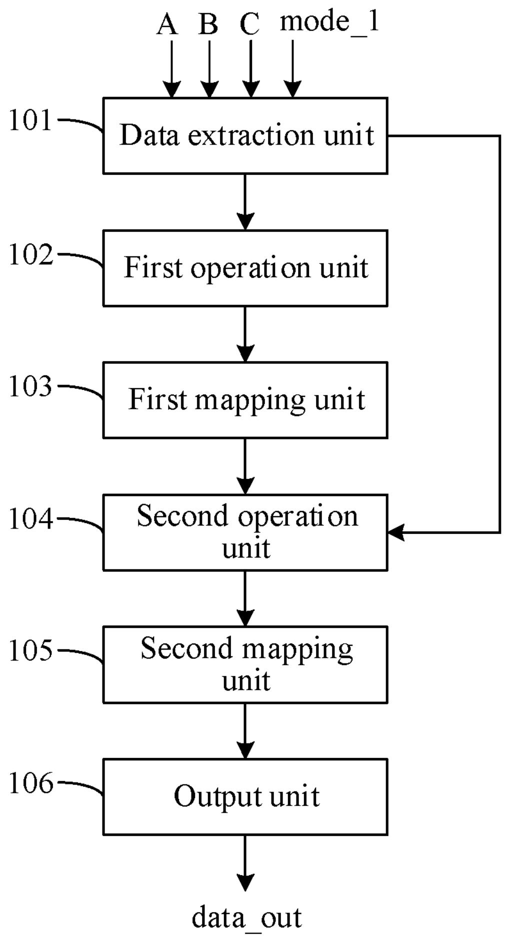
FIG. 1 is a schematic structural diagram of a multiply accumulator in a chip according to an exemplary embodiment of this disclosure.

To make objectives, technical solutions, and advantages of this disclosure clearer, the following further describes implementations of this disclosure in detail with reference to the accompanying drawings.

First, several terms involved in this disclosure are introduced.

A multiply accumulate (MAC) operation is an operation of multiplying a first operand A by a second operand B, and then adding a product and a third operand C. That is, $$C_{out} = A * B + C.$$

A multiply accumulator is a hardware circuit unit configured to implement a multiply accumulate operation in a digital signal processor or some microprocessors.

A fixed-point number is a representation method, of a number used in a computer, for ensuring that decimal point positions of all data in a machine are fixed. Two simple agreements are generally used in a computer: fixing a position of a decimal point before the highest bit of data, or fixing a position of a decimal point after the lowest bit. Generally, the former is often referred to as a fixed-point decimal, and the latter is often referred to as a fixed-point integer. When data is less than the minimum value that can be represented by a fixed-point number, the computer processes them as 0, called underflow. When the data is greater than the maximum value that can be represented by the fixed-point number, the computer cannot represent them, called overflow. Overflow and underflow are collectively referred to as overflow.

A floating-point number is an identification method of another number used in a computer, which is similar to scientific notation. Any binary number N may always be written as:

$$N=(-1)^S*2^E*M;$$

In the formula, M becomes a fractional part (also referred to as a mantissa) of the floating-point number N, and is a pure fractional; E is an exponent part (also referred to as an exponent) of the floating-point number N, and is an integer; and S is a sign bit of the floating-point number N. When the sign bit is 0, it indicates that the floating-point number N is positive, and when the sign bit is 1, it indicates that the floating-point number N is negative. This representation method is equivalent to that a decimal point position of a number may float freely with different scale factors within a specific range, and therefore, is referred to as a floating-point identification method.

Floating-point multiplication defines that, for a first floating-point number $$N_A=(-1)^{Sa}*2^{Ea}*M_a$$

and a second floating-point number $$N_B=(-1)^{Sb}*2^{Eb}*M_b,$$

a product of the two floating-point numbers is as follows:

$$N_A*N_B=(-1)^{(Sa+Sb)}*2^{(Ea+Eb)}*(M_a*M_b).$$

As a basic calculation unit, a multiply accumulator is widely used in a chip such as a CPU, a GPU, and an AI chip. With popularization of application scenarios such as AI, big data processing, and new air interface technologies, a high-performance floating-point operation becomes a main indicator of a chip. Because a floating-point calculation unit occupies more than 80% of an overall service operation amount, a hardware architecture that meets a plurality of factors such as universality, operation performance, and chip area is required. Therefore, this disclosure proposes a chip including a multiply accumulator, which features universality, scalability, smaller area, wider application, and better performance, and is applicable to products such as a GPU, an AI chip, a CPU, a DSP, and a dedicated chip.

The chip including a multiply accumulator provided in this disclosure can cover the following three features.

First, the chip has a smaller area but higher universality, that is, the chip is scalable. The same set of hardware structure is fully compatible with floating-point number operations of a plurality of bit widths. For example, floating-point number operations of a plurality of bit widths such as FP16, FP32, FP64, and even FP128 can be supported by using only one set of hardware structure.

Second, a customized floating-point operation mode is supported. For example, a set of hardware structure includes 16 multipliers whose operation bit widths are 16 bits. Therefore, by using the floating-point operation method provided in this disclosure, the hardware structure can support calculation of one group of FP64 operations, can support calculation of two groups of FP32 operations, and can support calculation of four groups of FP16 operations. Calculation of up to 16 groups of FP16 operands at the same time can also be supported, and calculation of up to four groups of FP32 operands at the same time can be supported. While a non-extended floating-point operation mode is implemented, different types of floating-point operation modes can be customized. For example, a floating-point operation mode that supports calculation of eight groups of FP16 operands can be customized.

Third, performance is higher. For example, in addition to supporting a non-extended floating-point operation mode, a data extension interface is further reserved on the chip. For example, the chip supports calculation of two groups of FP32 operands in the non-extended floating-point operation mode. However, the chip can further support, by using the data extension interface, a floating-point operation mode in which four groups of FP32 operands are calculated. Therefore, floating-point operation performance is greatly improved. As shown in Table 1, a floating-point processing performance relationship of a GPU is as follows for processing cases of three floating-point operations: one group of PF64 operands, two groups of PF32 operands, and four groups of FP16 operands.

FP32 processing performance=FP64 processing performance*2;

FP16 processing performance=FP32 processing performance*4;

FP16 processing performance=FP64 processing performance*8;

A floating-point processing performance relationship of the chip provided in this disclosure is as follows:

FP32 processing performance=FP64 processing performance*4;

FP16 processing performance=FP32 processing performance*4;

FP16 processing performance=FP64 processing performance*16.

It may be concluded from Table 1 that, compared with the GPU in Table 1, on the chip provided in this disclosure, FP32 processing performance is improved by one time (100%), and FP16 processing performance is improved by one time (100%). Tera floating-point operations per second (TFLOPS) is a quantity of floating-point operations performed per second in a trillion unit.

TABLE 1

| Data format | GPU/TFLOPS | Chip provided in this disclosure/TFLOPS |
|---|---|---|
| FP64 | 1 | 1 |
| FP32 | 2 | 4 |
| FP16 | 8 | 16 |

FIG. 1 shows a structural framework of a chip including a multiply accumulator according to this disclosure. The chip mainly includes a data extraction unit (data extraction circuitry) 101, a first operation unit (first operation circuitry) 102, a first mapping unit (first mapping circuitry) 103, a second operation unit (second operation circuitry) 104, a second mapping unit (second mapping circuitry) 105, and an output unit (output circuitry) 106. The data extraction unit 101 is connected to an input end of a floating-point number (i.e., an input configured to receive a floating-point number) and a first selection end (first selection input) mode_1 used for selecting a floating-point operation mode, and an output end of the data extraction unit 101 is separately connected to an input end of the first operation unit 102 and an input end of the second operation unit 104. An output end of the first operation unit 102 is connected to an input end of the first mapping unit 103. An output end of the first mapping unit 103 is connected to the input end of the second operation unit 104. An output end of the second operation unit 104 is connected to an input end of the second mapping unit 105. An output end of the second mapping unit 105 is connected to an input end of the output unit 106. For example, for a detailed description of the chip provided in this disclosure, refer to the following embodiments.

Figure 2:
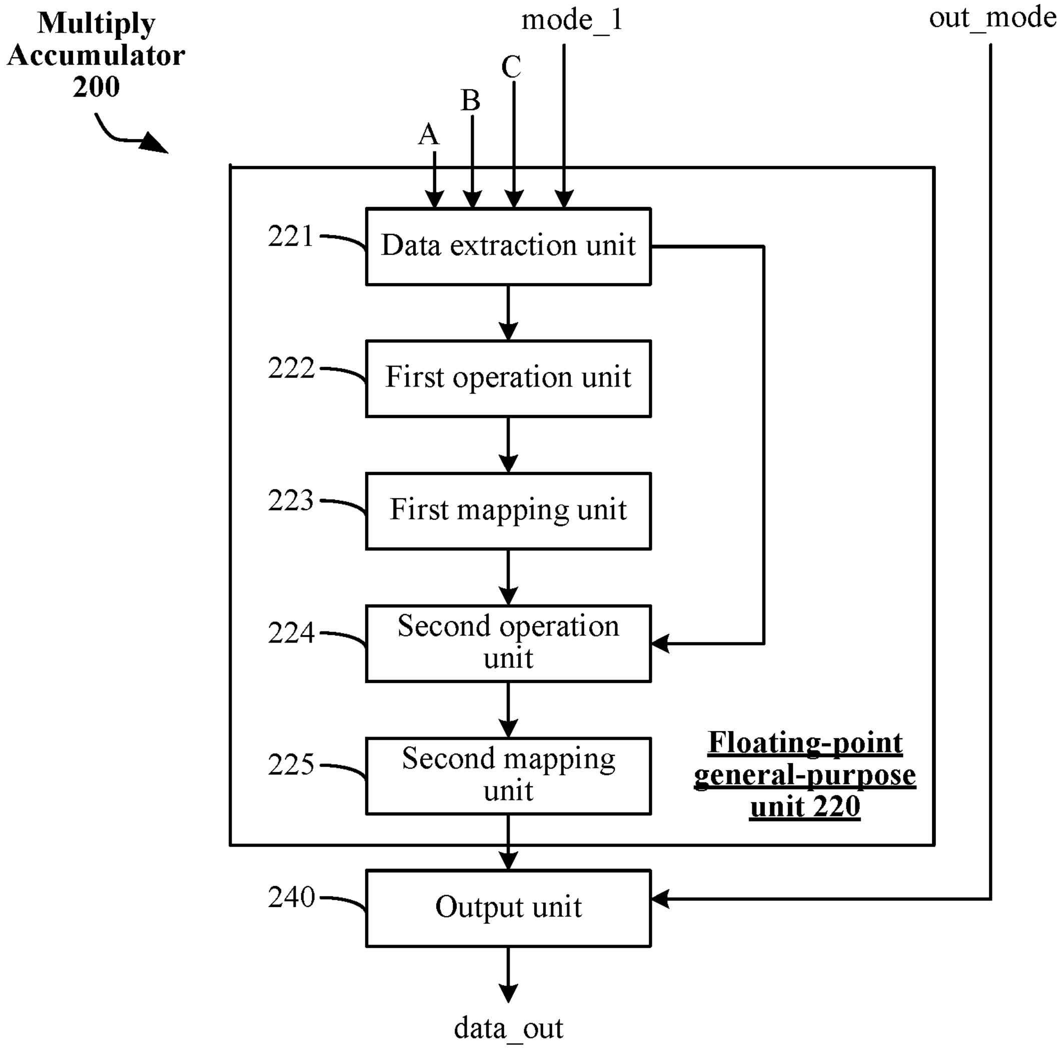
FIG. 2 is a schematic structural diagram of a multiply accumulator in a chip according to another exemplary embodiment of this disclosure.

FIG. 2 is a schematic structural diagram of a multiply accumulator 200 in a chip according to an exemplary embodiment of this disclosure. The multiply accumulator 200 includes an input end of a floating-point number (including an input end A of a first operand, an input end B of a second operand, and an input end C of a third operand), a first selection end mode_1, a floating-point general-purpose unit (floating-point general-purpose processing circuitry) 220, and an output unit (output circuit) 240. The floating-point general-purpose unit 220 is separately connected to the input ends A, B, and C of the floating-point number and the first selection end mode_1, and an output end of the floating-point general-purpose unit 220 is connected to an input end of the output unit 240.

The floating-point general-purpose unit 220 is configured to receive a first operand, a second operand, and a third operand of a first bit width $k_1$ that are inputted at the input end of the floating-point number; divide a fractional part of the first operand into m first suboperands of a second bit width $k_2$ according to a floating-point operation mode indicated by the first selection end, and divide a fractional part of the second operand into m second suboperands of the second bit width $k_2$, m being a positive integer; perform a multiplication operation of fractional parts based on the m first suboperands and the m second suboperands to obtain a fractional product; determine a floating-point number product of the first operand and the second operand based on a sign bit and an exponent part of the first operand, a sign bit and an exponent part of the second operand, and the fractional product; perform an addition operation on the floating-point number product and the third operand to obtain a floating-point number sum; and the output unit 240 is configured to output an operation result of a specified data format according to the floating-point number sum.

The second bit width $k_2=k_1/m$, and $k_2$ and $k_1$ are each a multiple of 2.

Different selection signals are corresponding to different floating-point operation modes; the floating-point general-purpose unit 220 includes a data extraction unit 221, and the data extraction unit 221 is separately connected to the input ends A, B, and C of the floating-point number and the first selection end mode_1; the data extraction unit 221 is configured to determine a floating-point operation mode corresponding to a selection signal inputted by the first selection end mode_1, an operation circuit indicated by the floating-point operation mode being configured to perform a multiply accumulate operation on the floating-point number of the first bit width $k_1$, and the first bit width $k_1$ being corresponding to a quantity m of split floating-point numbers; perform division from a lower order of the fractional part of the first operand according to the second bit width $k_2$ to obtain the m first suboperands; and perform division from a lower order of the fractional part of the second operand according to the second bit width $k_2$ to obtain the m second suboperands.

For example, if the first bit width $k_1$ is 32, and the second bit width $k_2$ is 16, lower 16 bits in 24 bits (including significand bits) of the fractional part of the first operand may be mapped to a 16-bit first suboperand, and higher 8 bits are mapped to a 16-bit first suboperand. The mapping of the foregoing suboperand starts from lower bits of the 16-bit width. If fractional bits are insufficient, 0 is used as a complement, for example, bits 8-15 in the 16-bit first suboperand obtained after mapping of the higher 8 bits are all 0s.

For example, when an exponent part value is 0, the fractional part in the value $S*2^E*M$ includes an integer part 0, that is, the fractional part is actually 0.M. When the exponent part value is not 0, the fractional part in the value $S*2^E*M$ includes an integer part 1, that is, the fractional part is actually 1.M. In the foregoing two cases, before an operation is performed on the fractional part 0.M and/or 1.M, one integer bit, that is, a significand bit, needs to be supplemented before the fractional part M.

A fractional part of the floating-point number of the first bit width $k_1$ supported by the floating-point operation mode is corresponding to a bit width $N_1$, and a fractional part of an operand of a minimum bit width supported by the multiply accumulator is corresponding to a bit width $N_2$; a remainder of $N_1$ divided by m is calculated, and a difference obtained by subtracting the remainder from m is determined as a first parameter $P_1$; a quotient value of a sum of $N_1$ and $P_1$ divided by m is calculated, and a difference obtained by subtracting $N_2$ from the quotient value is determined as a second parameter $P_2$; and in a case that both $P_1$ and $P_2$ are non-negative integers, m is determined as a split quantity corresponding to the floating-point number of the first bit width $k_1$.

In the foregoing process, an operand of a high bit width may be split into a quantity m of operands of low bit widths. It is also proved that a floating-point number of a high bit width can be degraded and then calculated. That is, the operand of the high bit width has scalability and matches scalability to be achieved by the chip.

For example, if the first bit width $k_1$ is 64, $N_1$ is 53 (including significand bits). If the foregoing minimum bit width is 16, $N_2$ is 11 (including significand bits). Assuming that m is 4, $P_1=P_2=3$ may be calculated based on the following formulas (1) to (3), and a fractional part of each floating-point number of the first bit width $k_1$ may be split into four suboperands, where the formulas are as follows:

$$N_1 + P_1 = (N_2 + P_2) * m; \quad (1)$$

$$P_1 = m - (N_1 \% m); \quad (2)$$

$$P_2 = \frac{(N_1 + P_1)}{m} - N_2. \quad (3)$$

Figure 3:
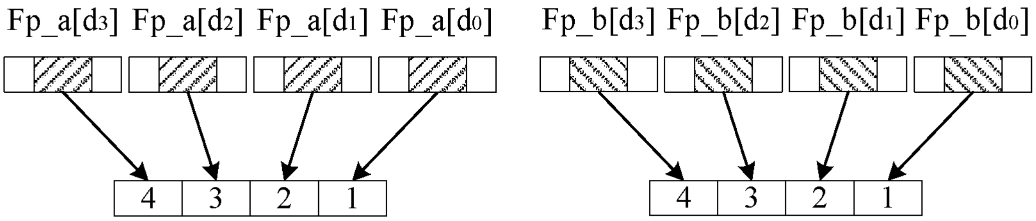
FIG. 3 is a schematic diagram of data extraction according to an exemplary embodiment of this disclosure.

For example, the second bit width $k_2=16$ is used as an example to describe a mapping manner of operands of different bit widths. FIG. 3 shows a mapping manner of four groups of FP16 operands. Each group of FP16 operands includes one first operand and one second operand. The four groups of FP16 operands are mapped to four groups of 16-bit suboperands, which are respectively {A0, B0}, {A1, B1}, {A2, B2}, and {A3, B3}. A0, A1, A2, and A3 are the four first suboperands, B0, B1, B2, and B3 are the second suboperands, and corresponding pseudo codes are as follows:

```
Sign_bit=15;// Bit 15 in the FP16 operand is a sign bit;
Exp_max=14;// Bit 14 in the FP16 operand is the largest bit of the exponent part;
Exp_min=10;// Bit 10 in the FP16 operand is the minimum bit of the exponent part;
Group_num=4;// The group number of the FP16 operation is 4;
For(i=0;i<Group_num;i=i+1){//Perform cyclic assignment until i=4;
fp_a_s[i]=fp_a_d[i][sign_bit];//Assign bit 15 of the first operand fp_a_d[i] of an ith group to fp_a_s[i];
fp_a_e[i]=fp_a_d[i][Exp_max: Exp_min];//Assign bits 10-14 of the first operand fp_a_d[i] of the ith group to fp_a_e[i];
fp_a_f[i]=fp_a_d[i][Exp_min-1:0];//Assign bits 0-9 of the first operand fp_a_d[i] of the ith group to fp_a_f[i];
fp_b_s[i]=fp_b_d[i][sign_bit];//Assign bit 15 of a second operand fp_b_d[i] of the ith group to fp_b_s[i];
fp_b_e[i]=fp_b_d[i][Exp_max: Exp_min];//Assign bits 10-14 of the second operand fp_b_d[i] of the ith group to fp_b_e[i];
fp_b_f[i]=fp_b_d[i][Exp_min-1:0];//Assign bits 0-9 of the second operand fp_b_d[i] of the ith group to fp_b_f[i];
}
A0 = pack_frac(fp_a_f0,SUB_PART_LL);//Map fp_a_f0 to lower 16 bits in lower 32 bits of a 64-bit width;
A1 = pack_frac(fp_a_f1,SUB_PART_LH);//Map fp_a_f1 to higher 16 bits in lower 32 bits of a 64-bit width;
A2 = pack_frac(fp_a_f2,SUB_PART_HL);//Map fp_a_f2 to lower 16 bits in higher 32 bits of a 64-bit width;
A3 = pack_frac(fp_a_f3,SUB_PART_HH);//Map fp_a_f3 to higher 16 bits in higher 32 bits of a 64-bit width;
B0 = pack_frac(fp_b_f0,SUB_PART_LL);//Map fp_bf_0 to lower 16 bits in lower 32 bits of a 64-bit width;
B1 = pack_frac(fp_b_f1,SUB_PART_LH);//Map fp_b_f1 to higher 16 bits in lower 32 bits of a 64-bit width;
B2 = pack_frac(fp_b_f2,SUB_PART_HL);//Map fp_b_f2 to lower 16 bits in higher 32 bits of a 64-bit width;
B3 = pack_frac(fp_b_f3,SUB_PART_HH);//Map fp_b_f3 to higher 16 bits in higher 32 bits of a 64-bit width.
```

Figure 4:
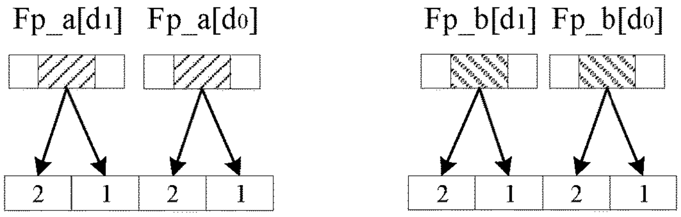
FIG. 4 is a schematic diagram of data extraction according to another exemplary embodiment of this disclosure.

FIG. 4 shows a mapping manner of two groups of FP32 operands. Each group of FP32 operands includes one first operand and one second operand. The two groups of FP32 operands are mapped to four groups of 16-bit suboperands, which are respectively {A0, B0}, {A1, B1}, {A2, B2}, and {A3, B3}. A0, A1, A2, and A3 are the first suboperands, B0, B1, B2, and B3 are the second suboperands, and corresponding pseudo codes are as follows:

```
Sign_bit=31;// Bit 31 in the FP32 operand is a sign bit;
Exp_max=30;// Bit 30 in the FP32 operand is the largest bit of the exponent part;
Exp min=23;// Bit 23 in the FP32 operand is the minimum bit of the exponent part;
Group_num=2;// The group number of the FP32 operation is 2;
For(i=0;i<Group_num;i=i+1){//Perform cyclic assignment until i=2;
fp_a_s[i]=fp_a_d[i][sign_bit];//Assign bit 31 of the first operand fp_a_d[i] of an ith group to fp_a_s[i];
fp_a_e[i]=fp_a_d[i][Exp_max: Exp_min];//Assign bits 23-30 of the first operand fp_a_d[i] of the ith group to fp_a_e[i];
fp_a_f[i]=fp_a_d[i][Exp_min-1:0];//Assign bits 0-22 of the first operand fp_a_d[i] of the ith group to fp_a_f[i];
fp_b_s[i]=fp_b_d[i][sign_bit];//Assign bit 31 of a second operand fp_b_d[i] of the ith group to fp_b_s[i];
fp_b_e[i]=fp_b_d[i][Exp_max: Exp_min];//Assign bits 23-30 of the second operand fp_b_d[i] of the ith group to fp_b_e[i];
fp_b_f[i]=fp_b_d[i][Exp_min-1:0];//Assign bits 0-22 of the second operand fp_b_d[i] of the ith group to fp_b_f[i];
}
A0 = pack_frac(fp_a_f[0], SUB_PART_LL);//Map lower 16 bits of fp_a_f0 to lower 16 bits in lower 32 bits of a 64-bit width;
```

-continued

```
A1 = pack_frac(fp_a_f[0], SUB_PART_LH);//Map higher 16 bits of fp_a_f0 to
higher 16 bits in lower 32 bits of a 64-bit width;
A2 = pack_frac(fp_a_f[1]. SUB_PART_HL);//Map lower 16 bits of fp_a_f1 to lower
16 bits in higher 32 bits of a 64-bit width;
A3 = pack_frac(fp_a_f[1]. SUB_PART_HH);//Map higher 16 bits of fp_a_f1 to
higher 16 bits in higher 32 bits of a 64-bit width;
B0 = pack_frac(fp_b_f[0]. SUB_PART_LL);//Map lower 16 bits of fp_bf_0 to lower
16 bits in lower 32 bits of a 64-bit width;
B1 = pack_frac(fp_b_f0[0]. SUB_PART_LH);//Map higher 16 bits of fp_b_f0 to
higher 16 bits in lower 32 bits of a 64-bit width;
B2 = pack_frac(fp_b_f0[1]. SUB_PART_HL);//Map lower 16 bits of fp_b_f1 to
lower 16 bits in higher 32 bits of a 64-bit width;
B3 = pack_frac(fp_b_f0[1]. SUB_PART_HH);//Map higher 16 bits of fp_b_f1 to
higher 16 bits in higher 32 bits of a 64-bit width.
```

Figure 5:
FIG. 5 is a schematic diagram of data extraction according to another exemplary embodiment of this disclosure.

FIG. 5 shows a mapping manner of one group of FP64 operands. One group of FP64 operands includes one first operand and one second operand. The group of FP64 operands is mapped to four groups of 16-bit suboperands, which are respectively {A0, B0}, {A1, B1}, {A2, B2}, and {A3, B3}, A0, A1, A2, and A3 are respectively split four first suboperands, B0, B1, B2, and B3 are split four second suboperands, and corresponding pseudo codes are as follows:

```
Sign_bit=63;// Bit 63 in the FP64 operand is a sign bit;
Exp_max=62;// Bit 62 in the FP64 operand is the largest bit of the exponent part;
Exp_min=52;// Bit 52 in the FP64 operand is the minimum bit of the exponent part;
fp_a_s0=fp_a_d0[sign_bit];//Assign bit 63 of the first operand fp_a_d0 to fp_a_s0;
fp_a_e0=fp_a_d0[Exp_max: Exp_min]; //Assign bits 52-62 of the first operand
fp_a_d0 to fp_a_e0;
fp_a_f0=fp_a_d0[Exp_min-1:0];//Assign bits 0-51 of the first operand fp_a_d0 to
fp_a_f0;
fp_b_s0=fp_b_d0[sign_bit];//Assign bit 63 of the second operand fp_b_d0 to
fp_b_s0;
fp_b_e0=fp_b_d0[Exp_max: Exp_min]; //Assign bits 52-62 of the second operand
fp_b_d0 to fp_b_e0;
fp_b_f0=fp_b_d0[Exp_min-1:0];//Assign bits 0-51 of the second operand fp_b_d0
to fp_b_f0;
A0 = pack_frac(fp_a_f0, SUB_PART_LL);//Map lower 16 bits in lower 32 bits of
fp_a_f0 to lower 16 bits in lower 32 bits of a 64-bit width;
A1 = pack_frac(fp_a_f0, SUB_PART_LH);//Map higher 16 bits in lower 32 bits of
fp_a_f0 to higher 16 bits in lower 32 bits of a 64-bit width;
A2 = pack_frac(fp_a_f0. SUB_PART_HL);//Map lower 16 bits in higher 32 bits of
fp_a_f0 to lower 16 bits in higher 32 bits of a 64-bit width;
A3 = pack_frac(fp_a_f0. SUB_PART_HH);//Map higher 16 bits in higher 32 bits of
fp_a_f0 to higher 16 bits in higher 32 bits of a 64-bit width;
B0 = pack_frac(fp_b_f0. SUB_PART_LL);//Map lower 16 bits in lower 32 bits of
fp_b_f0 to lower 16 bits in lower 32 bits of a 64-bit width;
B1 = pack_frac_(fp_b_f0. SUB_PART_LH);//Map lower 16 bits in lower 32 bits of
fp_b_f0 to higher 16 bits in lower 32 bits of a 64-bit width;
B2 = pack_frac(fp_b_f0. SUB_PART_HL);//Map lower 16 bits in higher 32 bits of
fp_b_f0 to lower 16 bits in higher 32 bits of a 64-bit width;
B3 = pack frac(fp_b_f0. SUB_PART_HH);//Map higher 16 bits in higher 32 bits of
fp_b_f0 to higher 16 bits in higher 32 bits of a 64-bit width.
```

Figure 6:
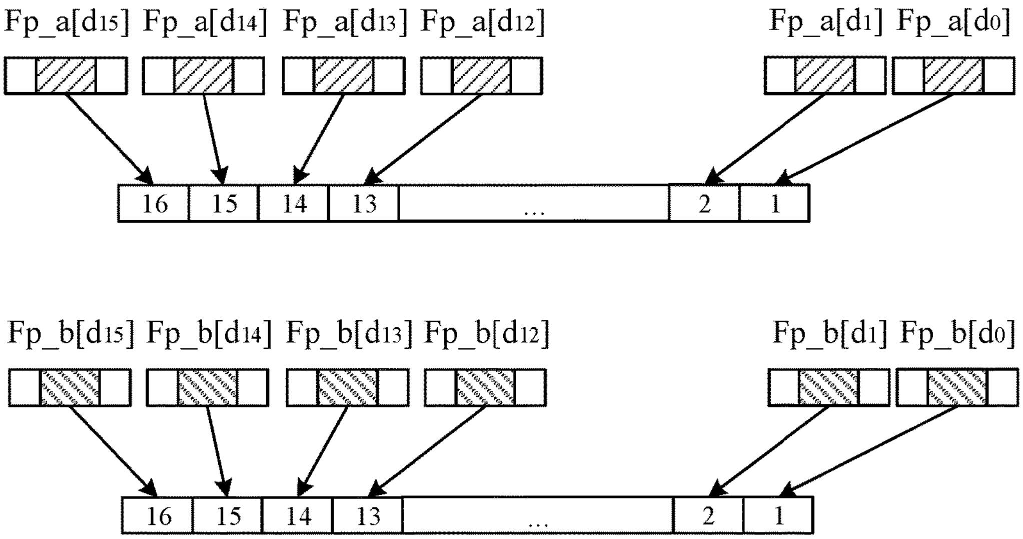
FIG. 6 is a schematic diagram of data extraction according to another exemplary embodiment of this disclosure.
Figure 7:
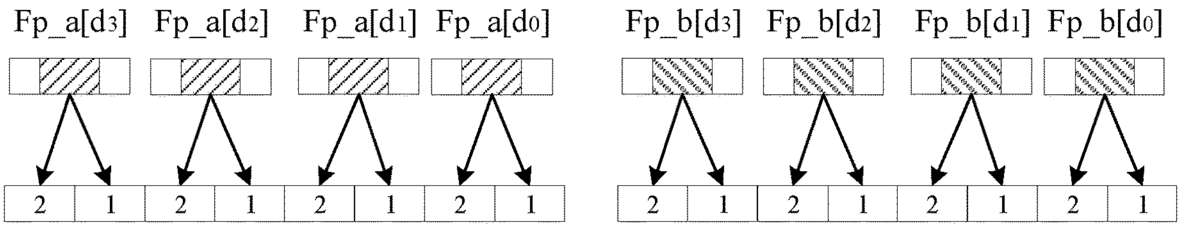
FIG. 7 is a schematic diagram of data extraction according to another exemplary embodiment of this disclosure.

FIG. 6 shows a mapping manner of 16 groups of FP16 operands. The 16 groups of FP16 operands are mapped to obtain 16 groups of 16-bit suboperands, which are respectively {A0, B0}, {A1, B1}, . . . , and {A15, B15}, where A0, A1, . . . , and A15 are respectively split 16 first suboperands, and B0, B1, . . . , and B15 are respectively split 16 second suboperands. FIG. 7 shows a mapping manner of four groups of FP32 operands. The four groups of FP32 operands are mapped to obtain eight groups of 16-bit suboperands, which are respectively {A0, B0}, {A1, B1}, . . . , and {A7, B7}, where A0, A1, . . . , and A7 are respectively split 8 first suboperands, and B0, B1, . . . , and B7 are respectively split eight second suboperands.

$k_2$=16 is used as an example to describe a correspondence between an input signal and a floating-point operation mode. Table 2 shows a structural diagram of an input signal and an output signal in three operation modes in this example.

TABLE 2

| Type | Signal name | Function description |
|---|---|---|
| Input | A | Floating-point data fp_a{di − 1, . . . d0}, where i is an integer |
| Input | B | Floating-point data fp_b{di − 1, . . . d0}, where i is an integer |
| Input | C | Floating-point data fp_c{di − 1, . . . d0}, where i is an integer |
| Input | mode_1 | When mode_1 = 0, it indicates a non-extended FP16 operation mode, and there are four groups of FP16 operands.<br>When mode_1 = 1, it indicates a non-extended FP32 operation mode, and there are two groups of FP32 operands. |

TABLE 2-continued

| Type | Signal name | Function description |
|---|---|---|
| | | When mode_1 = 2, it indicates a non-extended FP64 operation mode, and there is one group of FP64 operands.<br>When mode_1 = 3, it indicates an extended FP16 operation mode, and up to 16 groups of FP16 operands are supported at the same time.<br>When mode_1 = 4, it indicates an extended FP32 operation mode, and up to four groups of FP32 operands are supported at the same time.<br>. . .<br>When mode_1 = n, the floating-point operation mode is customized.<br>Note: Different FP formats and customized formats can be supported flexibly through extension of mode_1. |
| Input | out_mode | When out_mode = 0, fixed-point data is output.<br>When out_mode = 1, floating-point data is output. |
| Output | data_out | Output data data_out{di − 1 . . . d0}, where i is an integer. |

The foregoing is merely described by using 16 bits as an example. In different embodiments, possible designs with other numbers of bits, such as 64 bits, 32 bits, 16 bits, 8 bits, 4 bits, and 2 bits, may alternatively be used.

In conclusion, the chip provided in this embodiment includes a multiply accumulator, and a floating-point general unit is disposed in the multiply accumulator. In different floating-point operation modes, the floating-point general-purpose unit may split a floating-point number of a high bit width into suboperands of low bit widths to perform a multiply accumulate operation. Floating-point numbers of different high bit widths may be split into different quantities of suboperands of low bit widths. Correspondingly, the floating-point general-purpose unit controls, according to selection of a floating-point operation mode, a multiplier and an adder in the multiply accumulator to perform splitting and reassembly, and an operation circuit in the multiply accumulator becomes an operation circuit corresponding to the floating-point operation mode so as to perform a multiply accumulate operation, so that the operation circuit can support a multiply accumulate operation of floating-point numbers of different bit widths, and there is no need to integrate at least two hardware structures on the chip to support the multiply accumulate operation of floating-point numbers of different bit widths. In addition, the multiplier and the adder can be reused, and a quantity of multipliers and adders arranged can be reduced, thereby effectively reducing an area of the chip and reducing power consumption during running of the chip.

In an exemplary embodiment, as shown in FIG. 2, the floating-point general-purpose unit 220 includes a first operation unit 222, and an input end of the first operation unit 222 is connected to an output end of the data extraction unit 221; the first operation unit 222 further includes a multiplication array and an addition array, and an operation circuit indicated by the floating-point operation mode includes $m^2$ multipliers in the multiplication array and G adders in the addition array; the first operation unit 222 is configured to perform, by using the $m^2$ multipliers, a multiplication operation on the m first suboperands and the m second suboperands to obtain $m^2$ intermediate fractional products; and invoke the G adder to superpose and combine the $m^2$ intermediate fractional products to obtain the fractional product, G being a positive integer.

Figure 8:
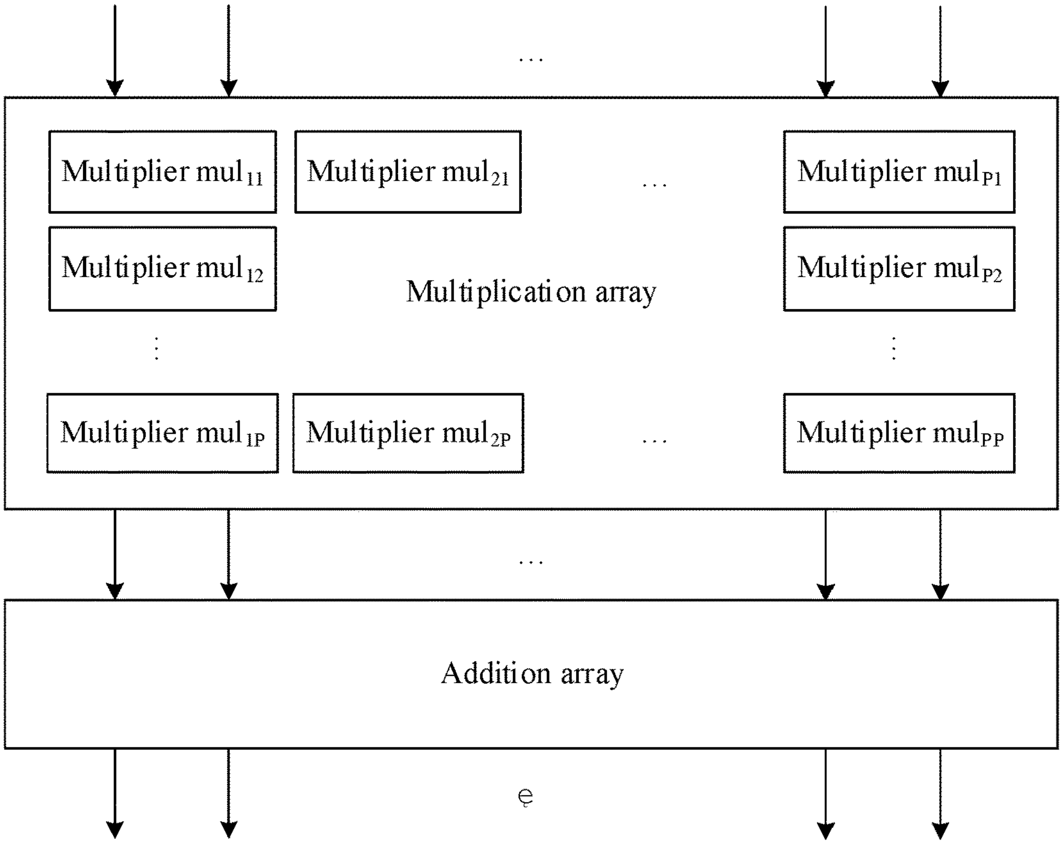
FIG. 8 is a schematic structural diagram of an operation array according to an exemplary embodiment of this disclosure.
Figure 9:
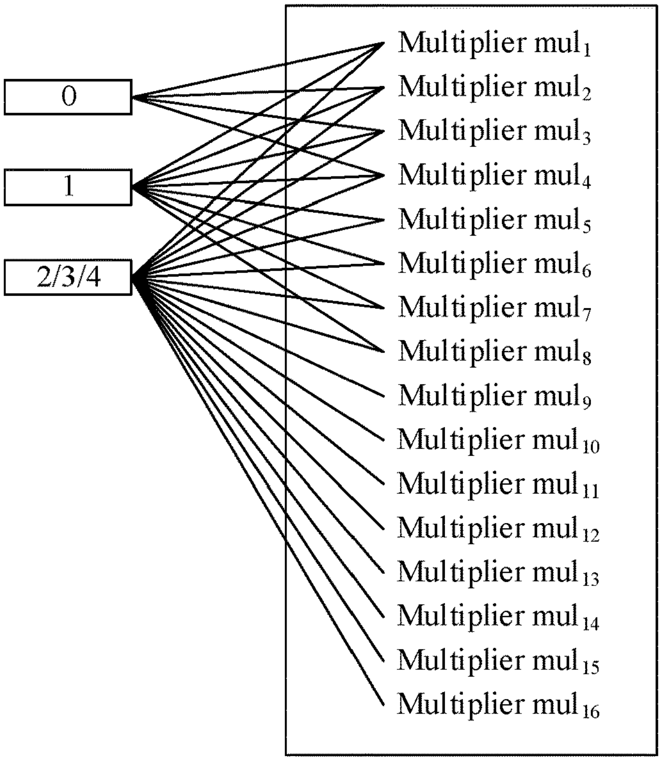
FIG. 9 is a schematic diagram of multiplier allocation according to an exemplary embodiment of this disclosure.

For example, as shown in FIG. 8, the first operation unit 222 includes a multiplication array and an addition array. When a selection signal inputted by the first selection end mode_1 is received, the operation circuit is switched to an operation circuit corresponding to the selection signal, that is, a multiplier in the multiplication array and an adder in the addition array are split and reassembled to form the operation circuit corresponding to the selection signal. m groups of suboperands are corresponding to $m^2$ multipliers. For example, as shown in FIG. 9, when a selection signal 0 indicates an operation of four groups of FP16 operands, a multiplier $mul_1$, a multiplier $mul_2$, a multiplier $mul_3$, and a multiplier $mul_4$ are split from a multiplication array including 16 multipliers when a multiplication operation is performed on the fractional parts of the first operand and the second operand, to perform a multiplication operation on m first suboperands and m second suboperands, to finally obtain a fractional product.

For another example, when a selection signal 1 indicates an operation of two groups of FP32 operands, a multiplier $mul_1$, a multiplier $mul_2$, a multiplier $mul_3$, a multiplier $mul_4$, a multiplier $mul_5$, a multiplier $mul_6$, a multiplier $mul_7$, and a multiplier $mul_8$ are split from a multiplication array including 16 multipliers when a multiplication operation is performed on the fractional parts of the first operand and the second operand. Eight adders are split from an addition array, and the eight adders and the eight multipliers are combined into one operation circuit. The operation circuit performs a multiplication operation on m first operands and m second operands to finally obtain a fractional product.

For another example, when a selection signal 2 indicates an operation of one group of FP64 operands, 16 multipliers in a multiplication array and 26 adders in an addition array are combined into an operation circuit when a multiplication operation is performed on the fractional parts of the first operand and the second operand, and the operation circuit performs a multiplication operation on m first suboperands and m second suboperands to finally obtain a fractional product.

Figure 10:
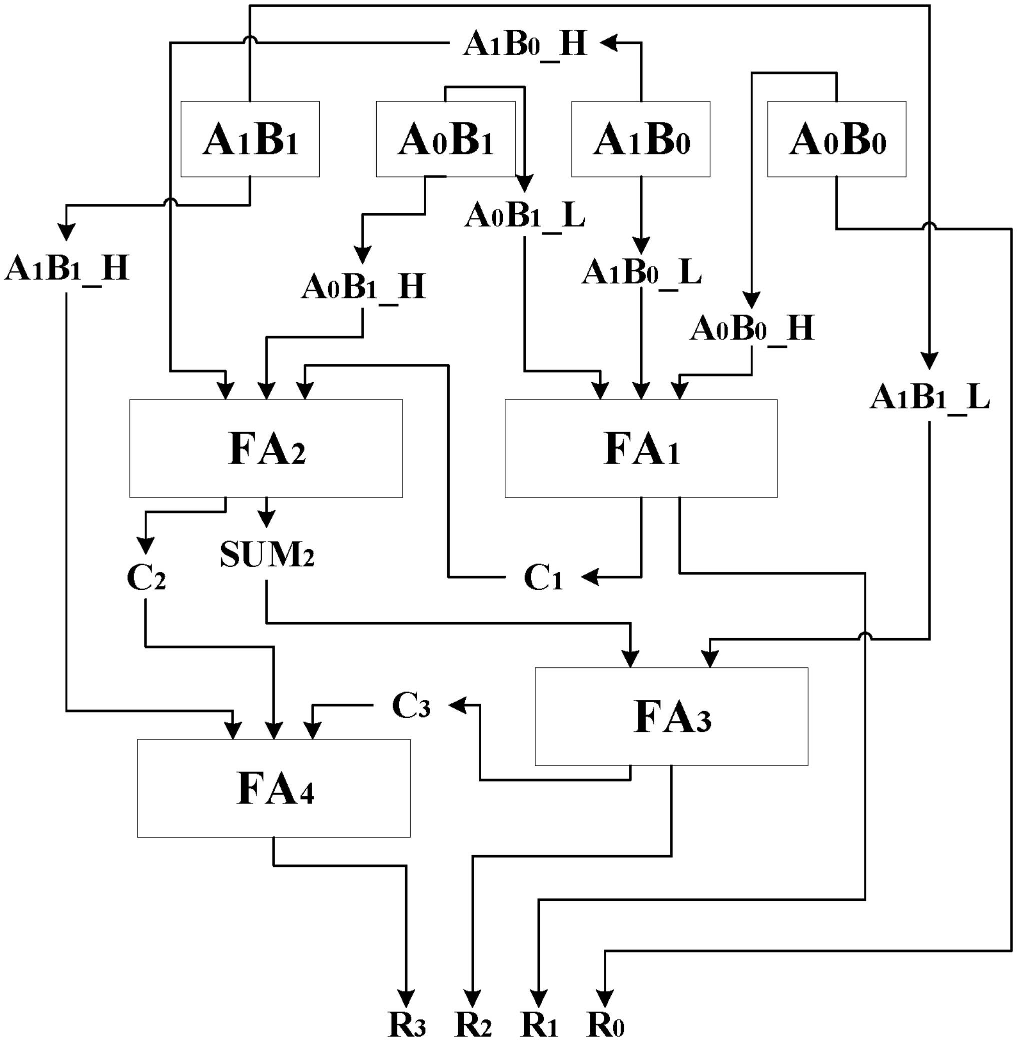
FIG. 10 is a schematic structural diagram of an operation circuit corresponding to a multiplication operation of a fractional part of a group of FP32 operands according to an exemplary embodiment of this disclosure.
Figure 11:
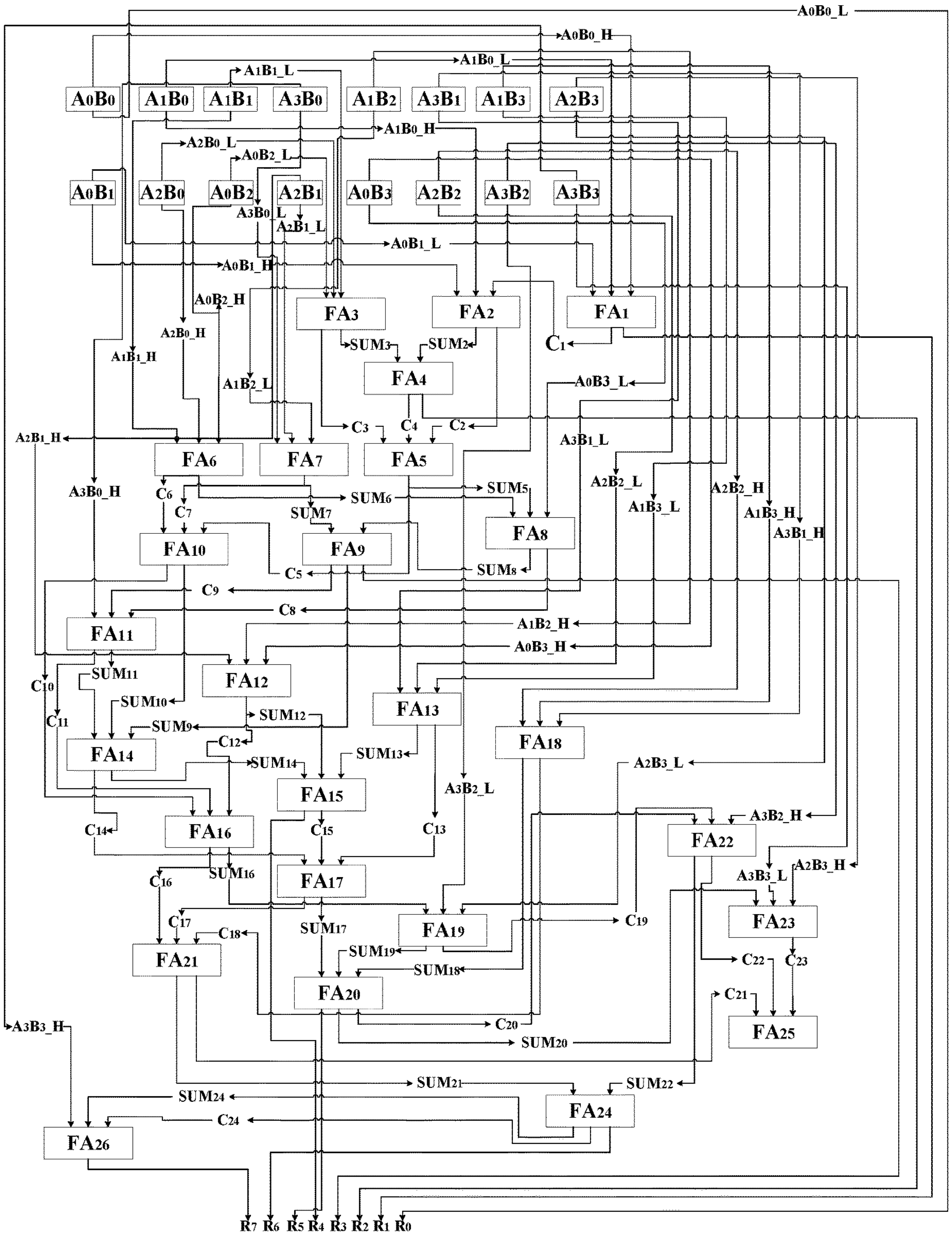
FIG. 11 is a schematic structural diagram of an operation circuit corresponding to a multiplication operation of a fractional part of a group of FP64 operands according to an exemplary embodiment of this disclosure.

For example, a multiplication operation of fractional parts of a group of FP32 operands is described in detail. As shown in FIG. 10, a first operand of 32 bits is split to obtain two first suboperands A0 and A1, a second operand of 32 bits is split to obtain two second suboperands B0 and B1, and four multipliers are used for calculating A0B0, A0B1, A1B0, and A1B1. Lower 13 bits A0B0_L of the product A0B0 are output as R0. An adder FA1 is used for adding higher 13 bits A0B0_H of the product A0B0, lower 13 bits A1B0 L of the product A1B0, and lower 13 bits A0B1 L of the product A0B1, and output 13 bits starting from lower bits as R1. An adder FA2 is used for adding higher 13 bits A1B0 H of the product A1B0, higher 13 bits A0B1 H of the product A0B1, and a carry bit C1 of FA1, and input 13 bits SUM2 starting from lower bits to an adder FA3. The adder FA3 is used for adding SUM2 and lower 13 bits A1B1 L of the product A1B1, and output 13 bits R2 starting from lower bits. An adder FA4 is used for adding higher 13 bits A1B1 H of the product A1B1, a carry bit C2 of FA2, and a carry bit C3 of FA3, and output a sum R3. Finally, a product of the fractional parts of the first operand and the second operand is obtained as {R3, R2, R1, R0}. Similarly, a multiplication operation process of fractional parts of a group of FP64 operands is shown in FIG. 11. In a multiplication operation process of fractional parts, an intermediate fractional product outputted by each multiplier needs to be first split and then accumulated, and a split bit width is (N1+P1)/2 (or N2+P2). For example, in FIG. 10, the split bit width of the intermediate fractional product is 13, and in FIG. 11, the split bit width of the intermediate fractional product is 14. The data extraction unit outputs a sequence {(Ai−1, Bi−1), (A1, B1), (A0, B0)}.

Figure 12:
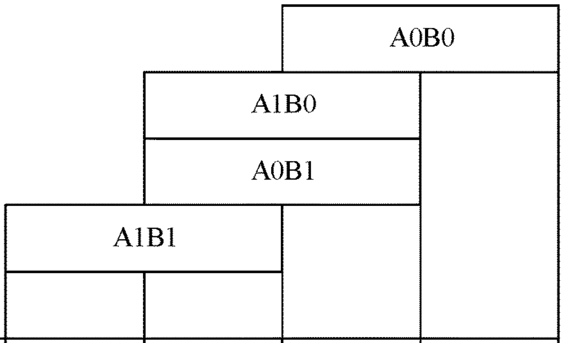
FIG. 12 is a schematic diagram of a relationship between a quantity of split operands and a quantity of used adders according to an exemplary embodiment of this disclosure.
Figure 13:
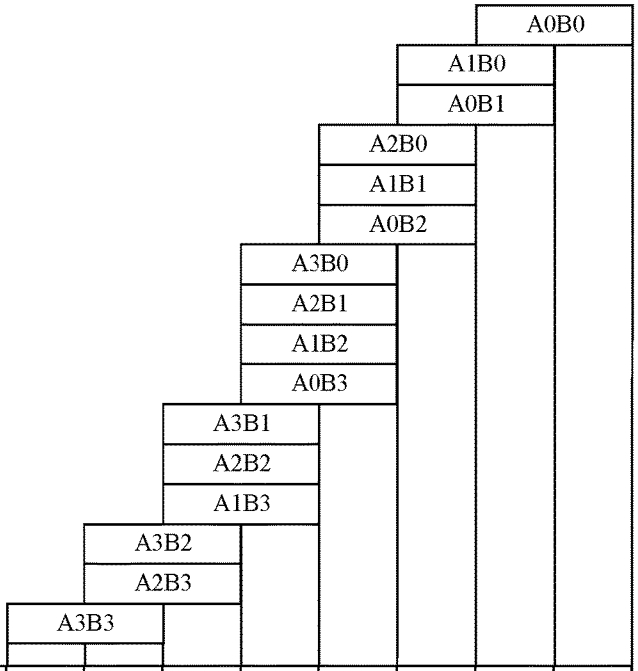
FIG. 13 is a schematic diagram of a relationship between a quantity of split operands and a quantity of used adders according to another exemplary embodiment of this disclosure.

When a multiplication operation is performed on m first suboperands and m second suboperands, G adders need to be used for accumulating intermediate fractional products, and a quantity G of adders is determined based on m and an adder structure. For example, m=2 and 4 is used for describing a rule of a quantity of addition suboperands corresponding to each intermediate fractional product, where the addition suboperands include at least one of suboperands obtained after splitting of the intermediate fractional product and suboperands generated due to carrying. For example, as shown in FIG. 10, an intermediate fractional product A0B0 includes two addition suboperands A0B0_H and A0B0_L, an intermediate fractional product A1B0 includes two addition suboperands A1B0 H and A1B0 L, an intermediate fractional product A0B1 includes two addition suboperands A0B1 H and A0B1 L, and the intermediate fractional products A0B0_H, A1B0 L, and A0B1 L are added to generate a carry bit C1, namely, an addition suboperand. When no carrying is considered, as shown in FIG. 12, when m=2, addition suboperands of all levels are 1, 3, 3, and 1 respectively. As shown in FIG. 13, when m=4, addition suboperands of all levels are 1, 3, 5, 7, 7, 5, 3, and 1 respectively. That is, when no carrying is considered, m intermediate fractional products are corresponding to 2 $m^2$ addition suboperands.

If carrying is considered, as shown in FIG. 12, when m=2, addition suboperands of all levels are 1, 3, 4, and 3 respectively. As shown in FIG. 13, when m=4, addition suboperands of all levels are 1, 3, 6, 10, 12, 11, 8, and 5 respectively. When carrying is considered, if an adder of a half adder structure is used for accumulating addition suboperands, seven adders are required when m=2, and 48 adders are required when m=4. If an adder of a full adder structure is used for accumulating adder suboperands, four adders are required when m=2, and 26 adders are required when m=4. When carrying is considered, if an adder of a half adder structure is used, a quantity of adders required at each level is equal to a quantity of addition suboperands at each level minus 1. If an adder of a full adder structure is used, a quantity of adders required at each level is equal to a quantity of addition suboperands at each level divided by 2 and rounded down. As shown in Table 3, with reference to FIG. 12 and FIG. 13, when carrying is considered, when m=2, a quantity of adders of a half adder structure=(1−1)+(3−1)+(4−1)+(3−1)=7, and a quantity of adders of a full adder structure=floor(½)+floor(3/2)+floor(4/2)+floor(3/2)=4. When m=4, a quantity of adders of a half adder structure=(1−1)+(3−1)+(6−1)+(10−1)+(12−1)+(11−1)+(8−1)+(5−1)=48, and a quantity of adders of a full adder structure=floor(½)+floor(3/2)+floor(6/2)+floor(10/2)+floor(12/2)+floor(11/2)+floor(8/2)+floor(5/2)=26, where floor is a rounding down function. In addition, an addition operation does not need to be performed at the first level. Therefore, a quantity of adders required at the first level is 0.

TABLE 3

| m | 2 | 4 |
|---|---|---|
| Quantity of adders of a half adder structure | 7 | 48 |
| Quantity of adders of a full adder structure | 4 | 26 |

FIG. 10 and FIG. 11 show an operation circuit structure of implementing a multiplication operation of fractional parts of a first operand and a second operand by using an adder that uses a full adder structure. In addition, the adder used in the addition operation in this embodiment may be of a half adder structure, a full adder structure, or another structure. In this embodiment, an implementation structure of the adder is not limited.

In conclusion, the multiplier and the adder included in the multiply accumulator on the chip provided in this embodiment can be split and reassembled to form an operation circuit that supports a floating-point operation of a type corresponding to a floating-point operation mode, so as to implement calculation of fractional parts of the first operand and the second operand, which gives scalability to a multiplication operation of the fractional part, and can perform split calculation on a fractional part of a floating-point number with a high bit width, so that the multiply accumulator can support a multiplication operation of floating-point numbers with a plurality of bit widths.

In some exemplary embodiments, the floating-point general-purpose unit 220 includes a first mapping unit 223, a second operation unit 224, and a second mapping unit 225. As shown in FIG. 2, an input end of the first mapping unit 223 is connected to an output end of the first operation unit 222. An input end of the second operation unit 224 is connected to the output end of the data extraction unit 221, and an output end of the second operation unit 224 is connected to an input end of the second mapping unit 225. An output end of the second mapping unit 225 is connected to an input end of the output unit 240.

The first mapping unit 223 is configured to map the fractional product to a register according to a first specified format.

The second operation unit 224 is configured to: read the fractional product of the first specified format from the register, extend and generate a first intermediate result of a second specified format for the fractional product of the first specified format based on the sign bit and the exponent part of the first operand and the sign bit and the exponent part of the second operand; and extend and generate a second intermediate result of the second specified format for a fractional part of the third operand based on a sign bit and an exponent part of the third operand; and the second mapping unit 225 is configured to add the first intermediate result and the second intermediate result to obtain the floating-point number sum.

Figure 14:
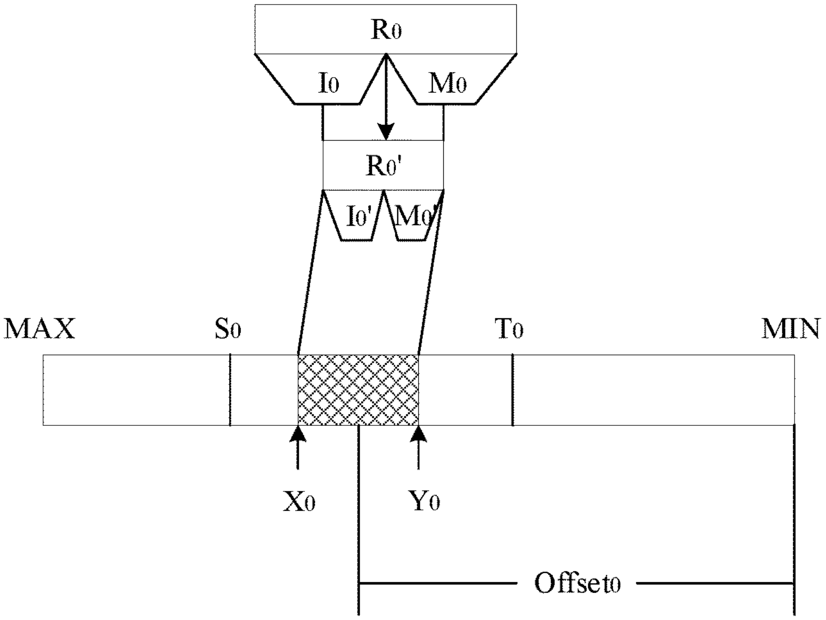
FIG. 14 is a schematic diagram of cutting of a fractional product according to an exemplary embodiment of this disclosure.
Figure 15:
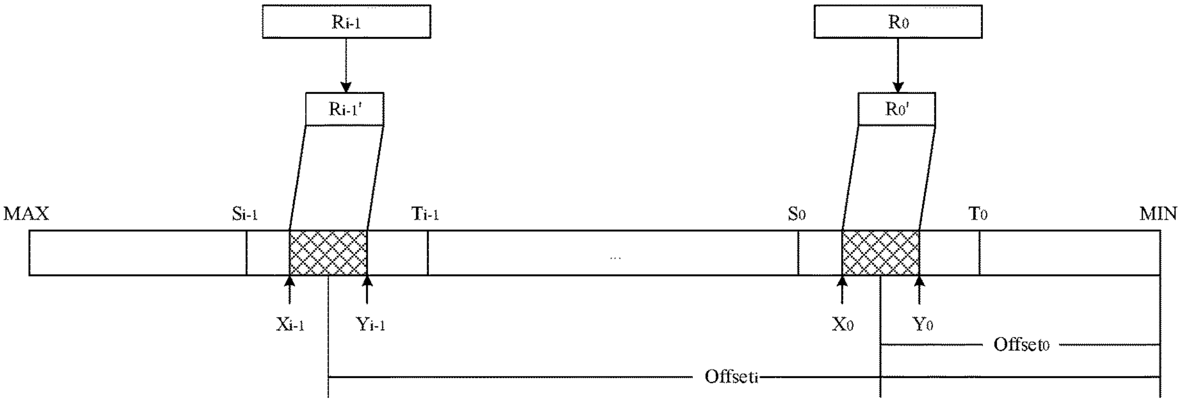
FIG. 15 is a schematic diagram of cutting of a fractional product according to another exemplary embodiment of this disclosure.

The fractional product includes an original integer part I and an original fractional part M; and the first mapping unit 223 is configured to cut the original integer part I according to an integer cutting bit width ε to obtain a cut integer part I'; cut the original fractional part M according to a fractional cutting bit width 3, to obtain a cut fractional part M'; and map the cut integer part I' and the cut fractional part M' to coordinates (X, Y) of the register to obtain the fractional product of the first specified format. For example, FIG. 14 and FIG. 15 show a cutting and mapping process of a fractional product corresponding to an $i^{th}$ group of operands. Cutting formulas are as follows:

$$I'_{i=1} = I_{i-1} - \varepsilon_{i-1}; \tag{4}$$

$$M'_{i-1} = M_{i-1} - 3_{i-1}; \tag{5}$$

$$0 \le \varepsilon_{i-1} < I_{i-1}; \varepsilon_{i-1} \text{ is an integer}; \tag{6}$$

$$0 \le 3_{i-1} < M_{i-1}; 3_{i-1} \text{ is an integer}; \tag{7}$$

Mapping formulas are as follows:

$$M_{i-1} = I'_{i=1} + \text{Offset}_{i-1}; \tag{8}$$

$$Y_{i-1} = Offset_{i-1} - M'_{i-1}; \tag{9}$$

$$S_{i-1} = 2^{e-1} - 1 + I'_{i-1} + \text{Offset}_{i-1}; \tag{10}$$

$$T_{i-1} = Offset_{i-1} - \left(2^{e-1} - 2 + M'_{i-1}\right); \tag{11}$$

$\text{Offset}_{i-1}$ refers to a location offset value corresponding to the $i^{th}$ group of operands, and the location offset value is a phenomenon that when a multiply accumulate operation is performed on at least two groups of operands at the same time, at least two fractional products need to be mapped to different locations, so that some data does not overlap between two fractional products; and e is a bit width of an exponent part of the $i^{th}$ group of operands, reserved space $(S_{i-1}, T_{i-1})$ on the register is space reserved for a fractional product corresponding to the $i^{th}$ group of operands, and $(X_{i-1}, Y_{i-1})$ is located in reserved space $(S_{i-1}, T_{i-1})$.

The integer cutting bit width ε and the fractional cutting bit width 3 are set based on system requirements. The integer cutting bit width ε and the fractional cutting bit width 3 that are corresponding to floating-point numbers of different bit widths in a multiply accumulate operation process are different or the same. For example, an integer cutting bit width ε and a fractional cutting bit width 3 that are corresponding to an FP16 operand are different from an integer cutting bit width ε and a fractional cutting bit width 3 that are corresponding to an FP64 operand.

In a process of performing a multiply accumulate operation on i groups of operands, integer cutting bit widths ε and fractional cutting bit widths 3 that are corresponding to different groups of operands are different or the same. For example, in a floating-point operation mode in which four groups of FP16 operands are simultaneously calculated, an integer cutting bit width ε and a fractional cutting bit width 3 that are corresponding to the first group of FP16 operands are different from an integer cutting bit width ε and a fractional cutting bit width 3 that are corresponding to the second group of FP16 operands. The fractional product is cut to obtain a valid range of data or meet a specific application requirement, and a cutting range is not limited in this embodiment.

The second mapping unit 225 includes K basic operation units (basic operation circuits), two adjacent basic operation units are connected in a cascading manner, and K is a positive integer; and the second mapping unit 225 is configured to: decompose the first intermediate result into K first numerical parts, decompose the second intermediate result into K second numerical parts, and generate K signal values corresponding to the K first numerical parts and the K second numerical parts, a $t^{th}$ signal value being used for indicating a connection relationship between a $t^{th}$ basic operation unit and a $(t+1)^{th}$ basic operation unit, and t being a positive integer less than or equal to K; map the K first numerical parts and the K second numerical parts to K storage units of the register according to a correspondence between numerical locations on operation bit widths, to obtain K groups of numerical parts in the K storage units; read the K groups of numerical parts into the K basic operation units, and correspondingly input the K signal values into the K basic operation units; and perform superposition and combination on the K groups of numerical parts by using the K basic operation units, to obtain the floating-point number sum.

For example, an operation bit width supported by the basic operation unit is L, and reserved space on the register is (S, T); and a quotient value of a difference between T and S divided by L is rounded up to obtain the K storage units on the register, S being one boundary coordinate of the reserved space, T being the other boundary coordinate of the reserved space, and L, T, and S being positive integers. For example, K may be represented by using the following formula:

$$K = \text{ceiling}\left((S - T)/L\right); \tag{12}$$

ceiling( ) means rounding up.

The second mapping unit 225 may calculate reserved space (S, T) according to formulas (10) and (11), that is, a bit width of an exponent part of an operand of the first bit width k1 is e, the fractional product of the first specified format includes an integer part I' and a fractional part M', and a location offset value of the fractional product of the first operand and the second operand in the register is Offset; and 1 is subtracted from a sum of $2^{e-1}$, I', and Offset to obtain S, and a difference obtained by subtracting a sum of $2^{e-1}$ and M' from a sum of Offset and 2 to obtain the reserved space (S, T).

Figure 16:
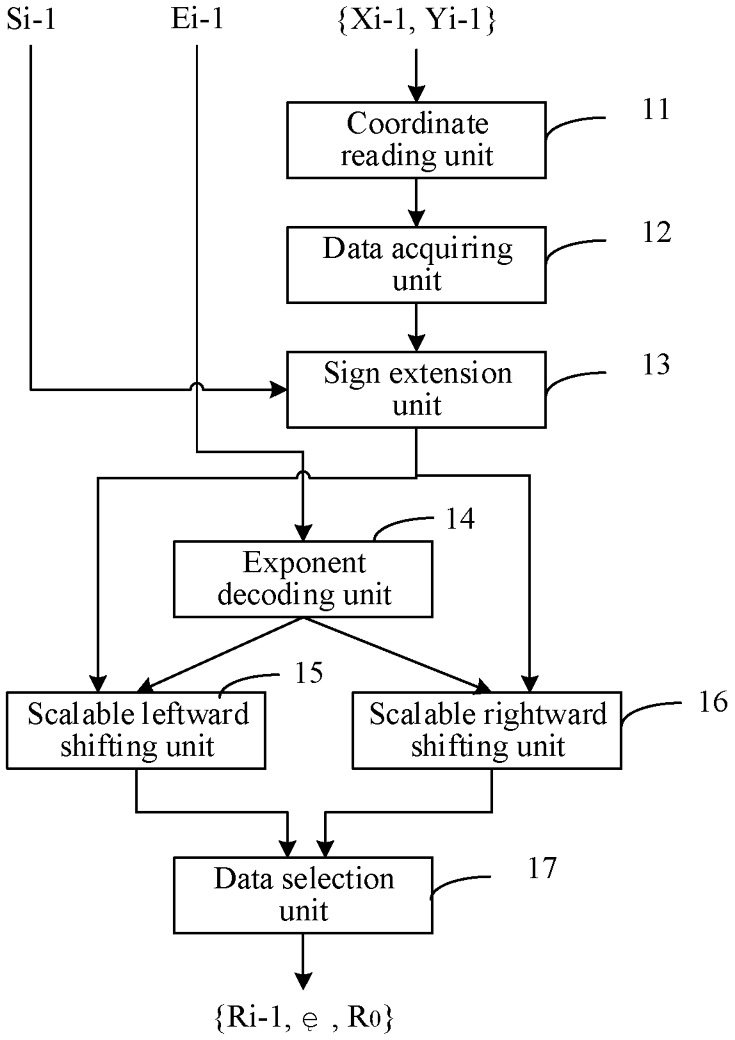
FIG. 16 is a schematic diagram of extension of a fractional product according to an exemplary embodiment of this disclosure.

For example, the second operation unit 224 determines a first intermediate result and a second intermediate result. As shown in FIG. 16, the second operation unit 224 includes a coordinate reading unit 11, a data acquiring unit 12, a sign extension unit 13, an exponent decoding unit 14, a scalable leftward shifting unit 15, a scalable rightward shifting unit 16, and a data selection unit 17. The coordinate reading unit 11 reads coordinates {Xi−1, Yi−1} of a fractional product of the first specified format in the register. The data acquiring unit 12 reads the fractional product of the first specified format according to the foregoing coordinates {Xi−1, Yi−1}. The sign extension unit 13 determines a sign bit of the fractional product of the first specified format based on sign bits of the first operand and the second operand. For example, the sign bit of the first operand is 1, and the sign bit of the second operand is 1. Then, the sign bit of the fractional product is determined as 0, the sign bit being 0 indicates positive, and the sign bit being 1 indicates negative. The exponent decoding unit 14 separately decodes encoded exponent parts of the first operand and the second operand to obtain decoded two exponents E1 and E2, and then calculates, with reference to $\text{Offset}_{i-1}$, an exponent E corresponding to the fractional product of the first specified format, where the exponent E is a signed number; if the exponent E is greater than 0, the exponent E enters the scalable leftward shifting unit; or if the exponent E is less than 0, the exponent E enters the scalable rightward shifting unit. The scalable leftward shifting unit 15 performs leftward shifting on the fractional product of the first specified format on an operation bit according to the exponent E, or the scalable rightward shifting unit 16 performs rightward shifting on the fractional product of the first specified format on the operation bit according to the exponent E, that is, determines the location of the fractional point of the fractional product, to generate a fractional product of a second specified format, that is, a first intermediate result.

Figure 17:
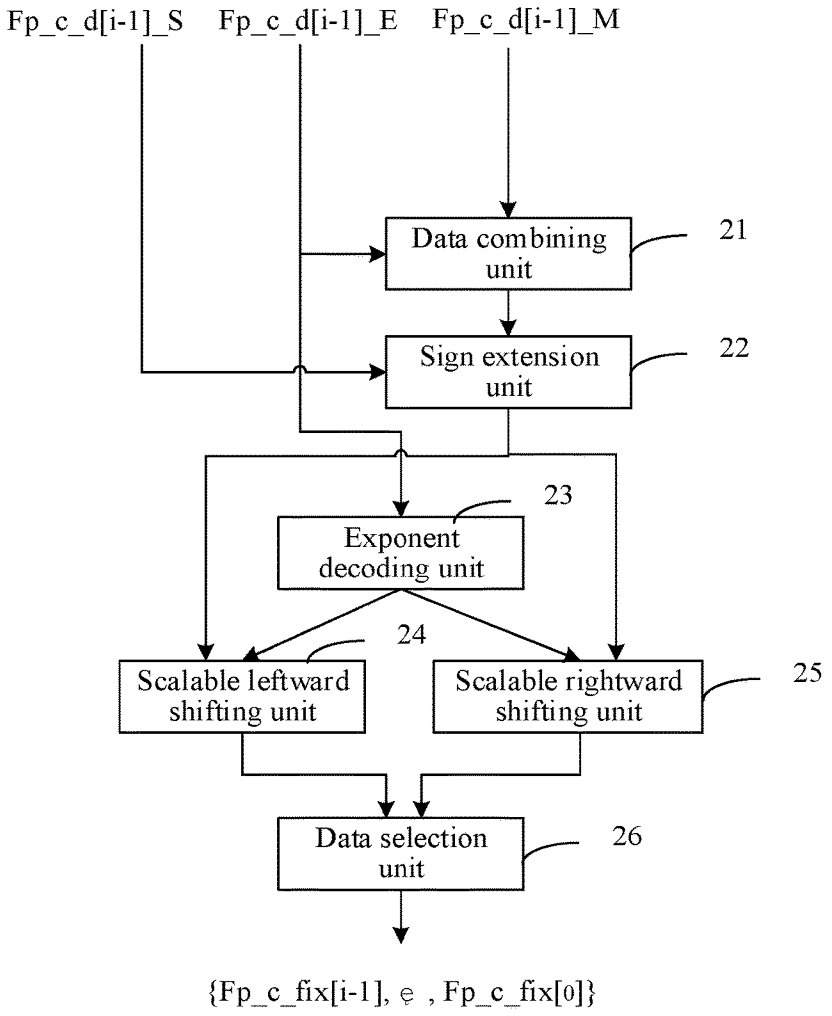
FIG. 17 is a schematic diagram of extension of a third operand according to an exemplary embodiment of this disclosure.

As shown in FIG. 17, the second operation unit 224 further includes a data combining unit 21, a sign extension unit 22, an exponent decoding unit 23, a scalable leftward shifting unit 24, a scalable rightward shifting unit 25, and a data selection unit 26. The data combining unit 21 combines an exponent part Fp_c_d[i−1]_E of the third operand with a fractional part Fp_c_d[i−1]_M to obtain an unsigned intermediate operation value. The sign extension unit 22 performs sign bit extension on a sign bit Fp_c_d[i−1]_S of the third operand for an unsigned intermediate operand, that is, adds a sign bit to the unsigned intermediate operand, and assigns Fp_c_d[i−1]_S to the foregoing added sign bit; for example, if the sign bit of the third operand is 1, assigns a value 1 to the added sign bit of the unsigned intermediate operand to finally obtain a signed intermediate operand. The exponent decoding unit 23 decodes an encoded exponent part of the third operand to obtain a decoded exponent E3, where the exponent E3 is a signed number; if the exponent E3 is greater than 0, the exponent E3 enters the scalable leftward shifting unit; or if the exponent E3 is less than 0, the exponent E3 enters the scalable rightward shifting unit. The scalable leftward shifting unit 24 moves the signed intermediate operand leftward on the operation bit according to the exponent E3, or the scalable rightward shifting unit 25 moves the signed intermediate operand rightward on the operation bit according to the exponent E3, that is, determines a location of the fractional point of the third operand to generate the third operand of the second specified format, that is, a second intermediate result.

Figure 18:
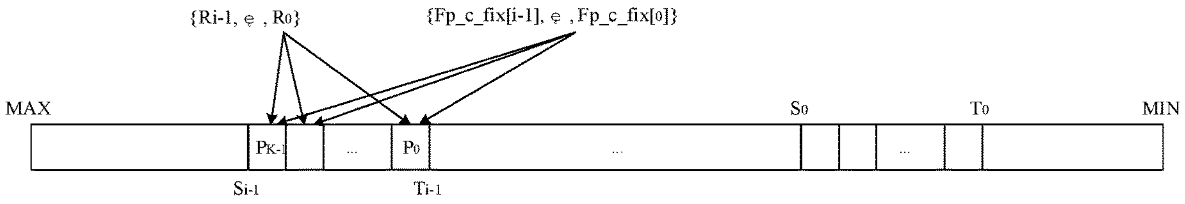
FIG. 18 is a schematic diagram of decomposition of an intermediate result according to an exemplary embodiment of this disclosure.
Figure 19:
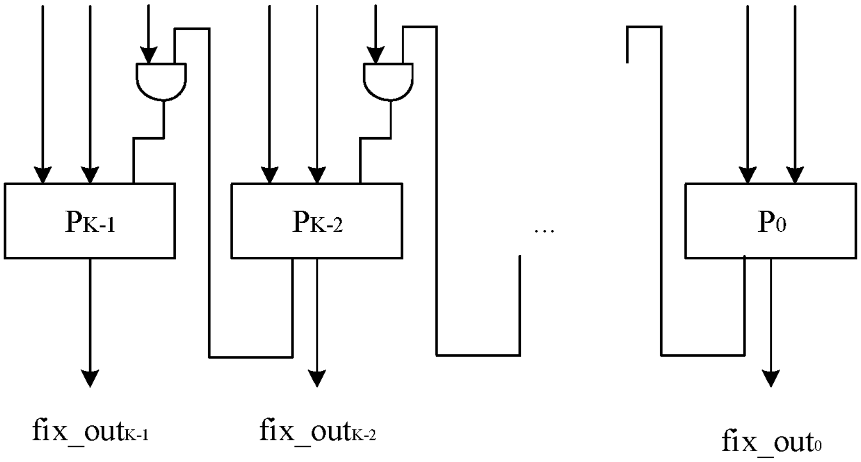
FIG. 19 is a schematic structural diagram of K basic operation units according to an exemplary embodiment of this disclosure.

For example, the fractional product of the second specified format and the third operand are fixed-point data, and the fractional product is in a one-to-one correspondence with an integer location, a fractional point location, and a fractional location of the third operand. For example, as shown in FIG. 18, the second mapping unit 225 determines to separately decompose the 32-bit first intermediate result and second intermediate result to obtain 16-bit first numerical parts AH and AL, and 16-bit second numerical parts BH and BL, and correspondingly stores AH and BH to a second storage unit, and correspondingly stores AL and BL to a first storage unit, and generates a relationship between adjacent numerical parts to represent a cascading relationship between adjacent basic operation units. For example, if AH and AL are obtained by decomposing one fractional product of the second specified format, a corresponding cascading relationship is connected and may be represented by 01. If AH and AL are obtained by decomposing two fractional products of the second specified format, a corresponding cascading relationship is disconnected and may be represented by 00. Two basic operation units P2 and P1 are used for calculating a sum of the first intermediate result and the second intermediate result. AL and the BL in the first storage unit are read to P1 for addition calculation, and AH and BH in the second storage unit are read to P2 for addition calculation. The cascading relationship further indicates a carrying relationship and an output relationship. If P2 and P1 are in a connected state, and an addition sum of AL and BL involves carrying, carrying is performed to P2, carrying calculation is performed on $P_2$, and a value $fix\_out_{k-1}$ (that is, a floating-point number sum) that is concatenated together is finally outputted. If P2 and P1 are in a disconnected state, two floating-point number sums are finally outputted, as shown in FIG. 19.

In conclusion, in a process of performing a floating-point operation, the multiply accumulator in the chip provided in this embodiment first calculates the fractional product of the fractional parts of the first operand and the second operand, and performs first mapping on the fractional product to generate a fractional product that meets the first specified format, so as to obtain a fractional product; then, performs sign extension and location movement on the fractional product and the fractional part of the third operand, so as to obtain the first intermediate result and the second intermediate result whose sign bits, integer bits, and fractional bits can be in a one-to-one correspondence, performs second mapping on the first intermediate result and the second intermediate result in a uniform format, decomposes the first intermediate result and the second intermediate result according to the operation bit width of the basic operation unit, and calculates the final floating-point number sum by using K basic operation units that are cascaded. The chip implements, by using the foregoing two operations and two times of mapping, an objective of performing a multiply accumulate operation on floating-point numbers with a plurality of bit widths by using one set of hardware structure.

The floating-point number sum is in a fixed-point format, and the specified data format includes a fixed-point format or a floating-point format; the multiply accumulator includes a second selection end out mode; and the output unit 240 is configured to output the floating-point number sum of the fixed-point format as the operation result according to a fixed-point format indicated by the second selection end; the output unit 240 is configured to: convert the floating-point number sum of the fixed-point format into a floating-point number sum of the floating-point format according to a floating-point format indicated by the second selection end, and output the floating-point number sum of the floating-point format as the operation result.

Figure 20:
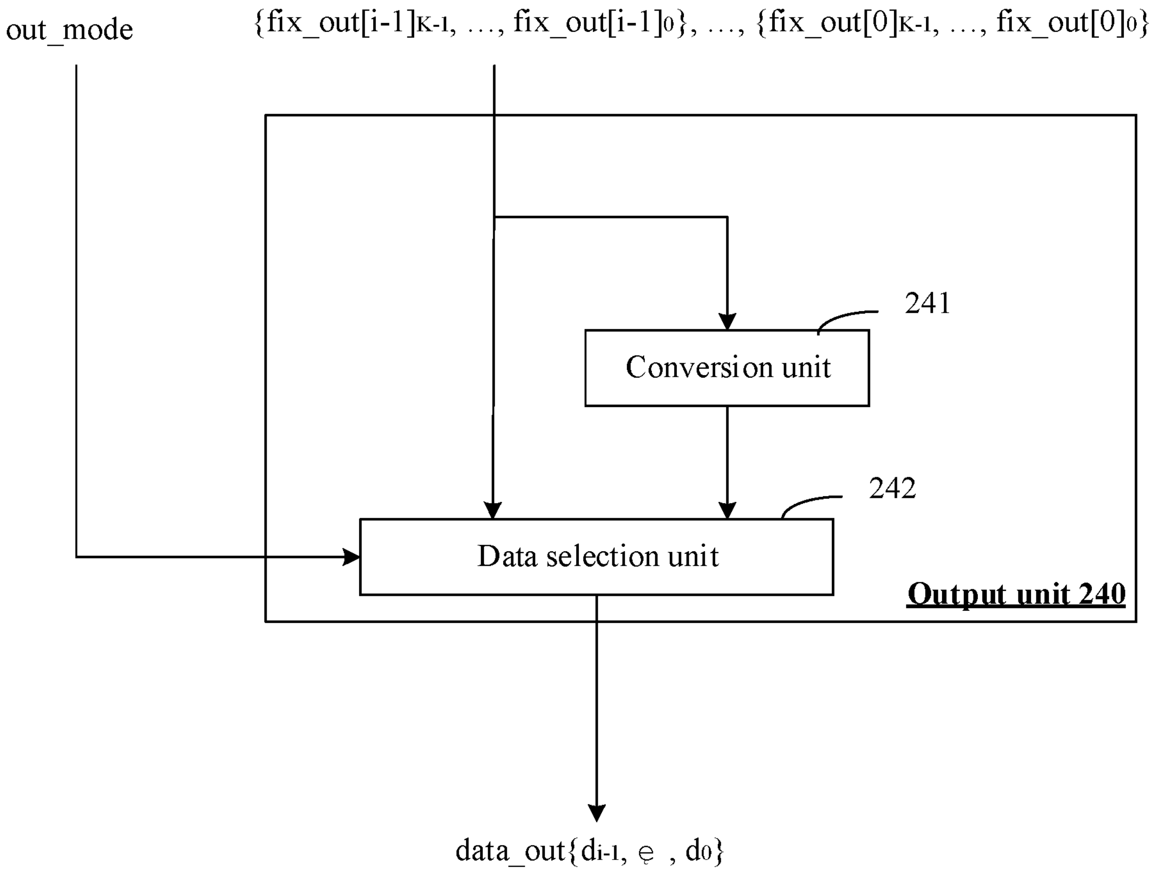
FIG. 20 is a schematic structural diagram of an output unit according to an exemplary embodiment of this disclosure.

For example, as shown in FIG. 20, the output unit 240 includes a fixed-point-to-floating-point conversion unit 241 and a data selection unit 242. As shown in Table 4, if a signal inputted by out mode is 0, a specified data format is a fixed-point format, and the data selection unit 242 selects to directly output a sum of i floating-point numbers of the fixed-point format inputted by K basic operation units: {fix_out[i−1]K−1, . . . , fix_out[i−1]0}, . . . , {fix_out[0]K−1, . . . , fix_out[0]0}, that is, a sum data_out{di−1, . . . , d0} of i floating-point numbers of the fixed-point format after a multiply accumulate operation of i groups of operands. If a signal inputted by out mode is 1, the specified data format is a floating-point format, and the conversion unit 421 converts the sum of i floating-point numbers of the fixed-point format, namely, {fix_out[i−1]K−1, . . . , fix_out[i−1]0}, . . . , {fix_out[0]K−1, . . . , fix_out[0]0}, into a sum of i floating-point numbers of the floating-point format. The data selection unit 242 selects to output the sum of i floating-point numbers of the floating-point format data_out{di−1, . . . , d0}.

TABLE 4

| out_mode | Specified data format |
|---|---|
| 0 | Fixed-point format |
| 1 | Floating-point format |

In conclusion, a selection unit for outputting a data format is added to the multiply accumulate unit in the chip provided in this embodiment, so that an outputted data format can be independently selected.

Figure 21:
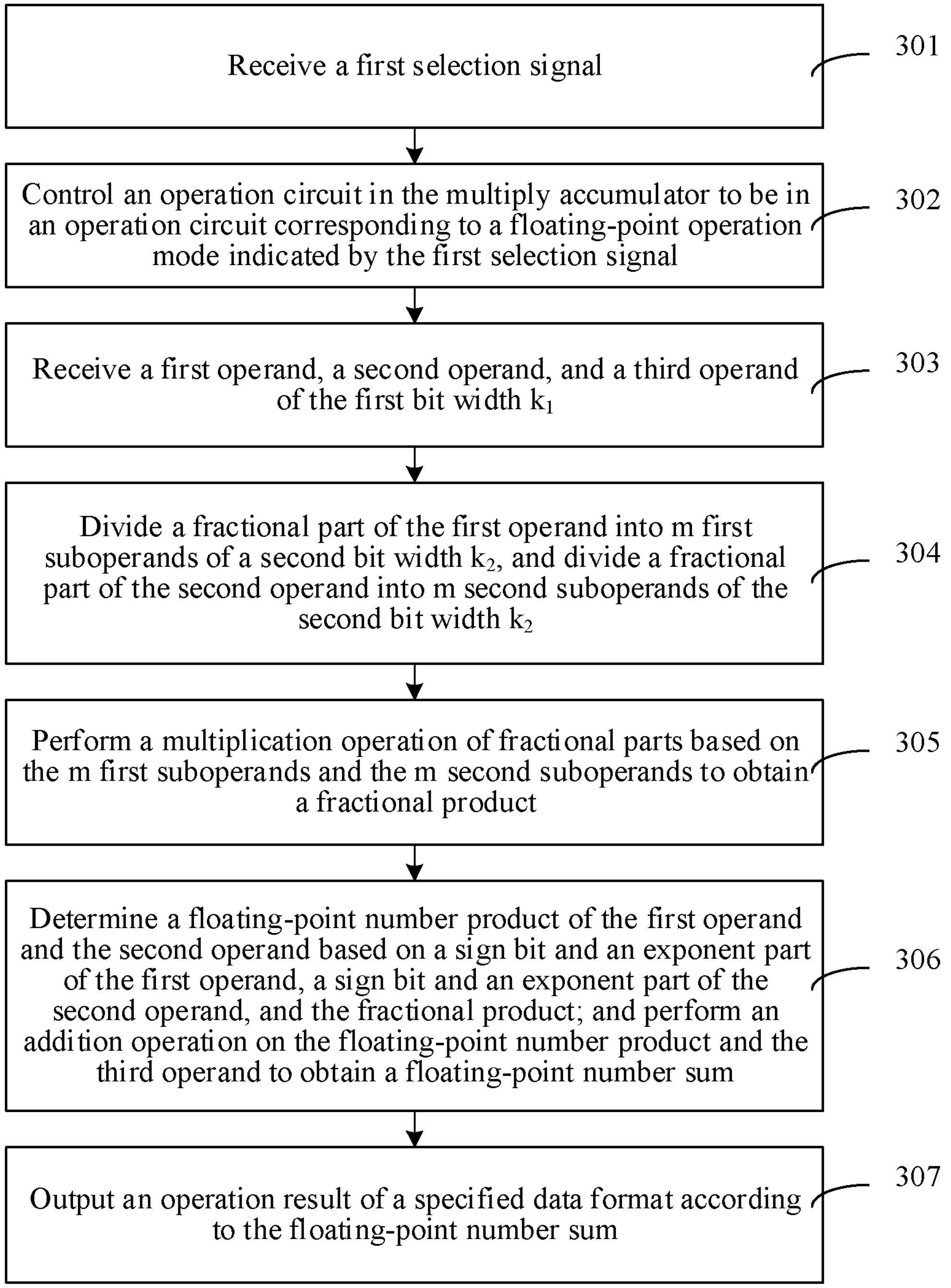
FIG. 21 is a flowchart of a floating-point operation control method according to an exemplary embodiment of this disclosure.

FIG. 21 is a flowchart of a floating-point operation control method according to an exemplary embodiment of this disclosure. The method is applied to the chip shown in any one of FIG. 1 to FIG. 20. The chip includes a multiply accumulator. The method includes the following steps.

In Step 301, a first selection signal is received.

The multiply accumulator includes a first selection end, the multiply accumulator supports a multiply accumulate operation of floating-point numbers with at least two types of bit widths, and the first selection end is used for selecting a floating-point operation mode. The multiply accumulator receives the first selection signal by using the first selection end, the first selection signal is used for indicating a floating-point operation mode. For example, the first selection signal is represented by using a four-digit binary number, and the first selection signal "0000" indicates a floating-point operation mode that supports operation of four groups of FP16 operands at the same time. Alternatively, the first selection signal "0001" indicates a floating-point operation mode that supports operation two groups of FP32 operands at the same time. Alternatively, the first selection signal "0010" indicates a floating-point operation mode that supports one group of FP64 operands at the same time, and so on.

In Step 302, an operation circuit in the multiply accumulator is controlled to be in an operation circuit corresponding to a floating-point operation mode indicated by the first selection signal.

The floating-point operation mode supports a multiply accumulate operation of a floating-point number of a first bit width $k_1$. The chip controls the operation circuit in the multiply accumulator to be in the operation circuit corresponding to the floating-point operation mode indicated by the first selection signal. That is, the chip determines a connection state of each operation unit used when the multiply accumulator is in the foregoing floating-point operation mode. For example, the multiply accumulator includes an addition array and a multiplication array used for a multiplication operation of a fractional part, and the chip determines, from the multiplication array and the addition array of the multiply accumulator, a multiplier and an adder that are correspondingly used for the floating-point operation mode, and determines a corresponding connection correspondence between multipliers, between the multiplier and the adder, and between adders, to obtain an operation circuit corresponding to a floating-point operation unit, so as to perform a multiply accumulate operation of a floating-point number by using a correct operation circuit after operands are inputted.

In Step 303, a first operand, a second operand, and a third operand of the first bit width $k_1$ are received.

The multiply accumulate unit includes an input end of a floating-point number and a data extraction unit, and the input end of the floating-point number is connected to an input end of the data extraction unit, and inputs the first operand, the second operand, and the third operand of the first bit width $k_1$ into the data extraction unit by using the input end of the floating-point number. The data extraction unit is configured to separately extract a sign bit, an exponent part, and a fractional part of each of the first operand, the second operand, and the third operand. The data extraction unit is further configured to: split the fractional parts of the first operand and the second operand, and split a fractional part of a floating-point number of a high bit width into suboperands of an operation bit width supported by the multiplier. For example, the operation bit width supported by the multiplier is 16 bits. If N1=24, N2=11, and m=2, P1=P2=2 can be calculated by using formulas (1) to (3), a fractional part of a 32-bit first operand may be split into two 13-bit first suboperands. For another example, the operation bit width supported by the multiplier is 16 bits. If N1=53, N2=11, and m=4, P1=P2=3 can be calculated by using formulas (1) to (3), a fractional part of a 64-bit first operand may be split into two 14-bit first suboperands.

In Step 304, a fractional part of the first operand is divided into m first suboperands of a second bit width $k_2$, and a fractional part of the second operand is divided into m second suboperands of the second bit width $k_2$.

The second bit width $k_2=k_1/m$, both $k_2$ and $k_1$ are multiples of 2, and m is a positive integer. For example, as shown in FIG. 3, four groups of FP16 operands may be mapped to obtain four groups of 16-bit suboperands. Each group of FP16 operands includes one first operand and one second operand. The four groups of 16-bit suboperands obtained by the foregoing mapping are respectively {A0, B0}, {A1, B1}, {A2, B2}, and {A3, B3}, A0, A1, A2, and A3 are respectively split four first suboperands, and B0, B1, B2, and B3 are split four second suboperands.

In Step 305, a multiplication operation of fractional parts is performed based on the m first suboperands and the m second suboperands to obtain a fractional product.

For example, the multiply accumulator includes a first operation unit, and an operation circuit in the first operation unit corresponding to the floating-point operation mode includes $m^2$ multipliers and G adders. The chip performs, by using the $m^2$ multipliers, a multiplication operation on the m first suboperands and the m second suboperands to obtain $m^2$ intermediate fractional products; and invokes the G adder to superpose and combine the $m^2$ intermediate fractional products to obtain the fractional product, G being a positive integer.

For example, as shown in FIG. 10, a multiplication operation of fractional parts of a group of FP32 operands is performed, a 32-bit first operand is split to obtain two first suboperands A0 and A1, and a 32-bit second operand is split to obtain two second suboperands B0 and B1. For example, m=2, N1=24, and N2=11. P1=2 and P2=2 can be calculated by using formulas (1) to (3). Therefore, a split bit width of the 32-bit first/second operand may be (N1+P1)/2=N2+P2=13. Further, the first operation unit calculates A0B0, A0B1, A1B0, and A1B1 by using four multipliers, and outputs lower 13 bits A0B0_L of the product A0B0 as R0. An adder FA1 is used for adding higher 13 bits A0B0_H of the product A0B0, lower 13 bits A1B0_L of the product A1B0, and lower 13 bits A0B1_L of the product A0B1, and output 13 bits starting from lower bits as R1. An adder FA2 is used for adding higher 13 bits A1B0 H of the product A1B0, higher 13 bits A0B1_H of the product A0B1, and a carry bit C1 of FA1, and input 13 bits SUM2 starting from lower bits to an adder FA3. The adder FA3 is used for adding SUM2 and lower 13 bits A1B1 L of the product A1B1, and output 13 bits R2 starting from lower bits. An adder FA4 is used for adding higher 13 bits A1B1 H of the product A1B1, a carry bit C2 of FA2, and a carry bit C3 of FA3, and output a sum R3. Finally, a product of the fractional parts of the first operand and the second operand is obtained as {R3, R2, R1, R0}.

In Step 306, a floating-point number product of the first operand and the second operand is determined based on a sign bit and an exponent part of the first operand, a sign bit and an exponent part of the second operand, and the fractional product; and an addition operation is performed on the floating-point number product and the third operand to obtain a floating-point number sum.

The multiply accumulator further includes a first mapping unit, a second operation unit, and a second mapping unit. The chip maps the fractional product to a register according to a first specified format by using the first mapping unit; reads, by using the second operation unit, the fractional product of the first specified format from the register, extends and generates a first intermediate result (that is, a floating-point number product) of a second specified format for the fractional product of the first specified format based on the sign bit and the exponent part of the first operand and the sign bit and the exponent part of the second operand; extends and generates a second intermediate result of the second specified format for a fractional part of the third operand based on a sign bit and an exponent part of the third operand; and adds the first intermediate result and the second intermediate result to obtain the floating-point number sum by using the second mapping unit.

The fractional product includes an original integer part and an original fractional part; and for mapping of the fractional product, the first mapping unit cuts the original integer part according to an integer cutting bit width to obtain a cut integer part; cuts the original fractional part according to a fractional cutting bit width, to obtain a cut fractional part; and maps the cut integer part and the cut fractional part to coordinates of the register to obtain the fractional product of the first specified format. For example, the first mapping unit calculates the cut fractional part and integer part by using the foregoing formulas (4) to (7); and then, determines storage space (that is, reserved space) that is in the register and that is reserved for the fractional product by using the foregoing formulas (10) and (11), and maps the cut fractional part and integer part to the reserved space by using the foregoing formulas (8) and (9).

The multiply accumulator includes K basic operation units, two adjacent basic operation units are connected in a cascading manner, and K is a positive integer; and for summing calculation of the first intermediate result and the second intermediate result, the second mapping unit decomposes the first intermediate result into K first numerical parts, decomposes the second intermediate result into K second numerical parts, and generates K signal values corresponding to the K first numerical parts and the K second numerical parts, a $t^{th}$ signal value being used for indicating a connection relationship between a $t^{th}$ basic operation unit and a $(t+1)^{th}$ basic operation unit, and t being a positive integer less than or equal to K; maps the K first numerical parts and the K second numerical parts to K storage units of the register according to a correspondence between numerical locations on operation bit widths, to obtain K groups of numerical parts in the K storage units; reads the K groups of numerical parts into the K basic operation units, and correspondingly inputs the K signal values into the K basic operation units; and performs superposition and combination on the K groups of numerical parts by using the K basic operation units, to obtain the floating-point number sum.

For example, referring to FIG. 18 and FIG. 19, the second mapping unit separately decomposes the 32-bit first intermediate result and second intermediate result to obtain 16-bit first numerical parts AH and AL, and 16-bit second numerical parts BH and BL, and correspondingly stores AH and BH to a second storage unit, and correspondingly stores AL and BL to a first storage unit, and generates a relationship between adjacent numerical parts to represent a cascading relationship between adjacent basic operation units. For example, if AH and AL are obtained by decomposing one fractional product of the second specified format, a corresponding cascading relationship is connected and may be represented by 01. If AH and AL are obtained by decomposing two fractional products of the second specified format, a corresponding cascading relationship is disconnected and may be represented by 00. Two basic operation units P2 and P1 are used for calculating a sum of the first intermediate result and the second intermediate result. AL and the BL in the first storage unit are read to P1 for addition calculation, and AH and BH in the second storage unit are read to P2 for addition calculation. If the cascading relationship between P2 and P1 is connected, carrying calculation may be performed by P2, and finally, a value $fix\_out_0$ (that is, a floating-point number sum) that is spliced together is outputted. If the cascading relationship between P2 and P1 is disconnected, two floating-point number sums $fix\_out_1$ and $fix\_out_0$ are finally outputted in parallel.

The fractional product of the first specified format refers to a product of the fractional parts of the first operand and the second operand. The fractional product of the second specified format is a product of the first operand and the second operand. For example, when a signed first operand $N_A=(-1)^{Sa}*2^{Ea}*M_a$, and a signed second operand $N_B=(-1)^{Sb}*2^{Eb}*M_b$, the fractional product of the first specified format refers to a product $M_a*M_b$ of $M_a$ and $M_b$, and the fractional product of the second specified format refers to a product $(-1)^{(Sa+Sb)}*2^{(Ea+Eb)}*(M_a*M_b)$ of $N_A$ and $N_B$.

In Step 307, an operation result in a specified data format is output according to the floating-point number sum.

The floating-point number sum is in a fixed-point format. The specified data format includes a fixed-point format or a floating-point format; a second selection signal is received, and the second selection signal is used for indicating that the specified data format is a fixed-point format or a floating-point format; and the chip outputs, according to the fixed-point format indicated by the second selection signal, the floating-point number sum of the fixed-point format as the operation result; or converts the floating-point number sum of the fixed-point format into a floating-point number sum of the floating-point format according to a floating-point format indicated by the second selection signal, and outputs the floating-point number sum of the floating-point format as the operation result.

In conclusion, in the floating-point operation control method provided in this embodiment, in different floating-point operation modes, the chip may split a floating-point number of a high bit width into suboperands of low bit widths to perform a multiply accumulate operation. Floating-point numbers of different high bit widths may be split into different quantities of suboperands of low bit widths. Correspondingly, the chip controls, according to selection of a floating-point operation mode, a multiplier and an adder in the multiply accumulator to perform splitting and reassembly, and an operation circuit in the multiply accumulator becomes an operation circuit corresponding to the floating-point operation mode so as to perform a multiply accumulate operation, so that the operation circuit can support a multiply accumulate operation of floating-point numbers of different bit widths, and there is no need to integrate at least two hardware structures on the chip to support the multiply accumulate operation of floating-point numbers of different bit widths. In addition, the multiplier and the adder can be reused, and a quantity of multipliers and adders arranged can be reduced, thereby effectively reducing an area of the chip and reducing power consumption during running of the chip.

Figure 22:
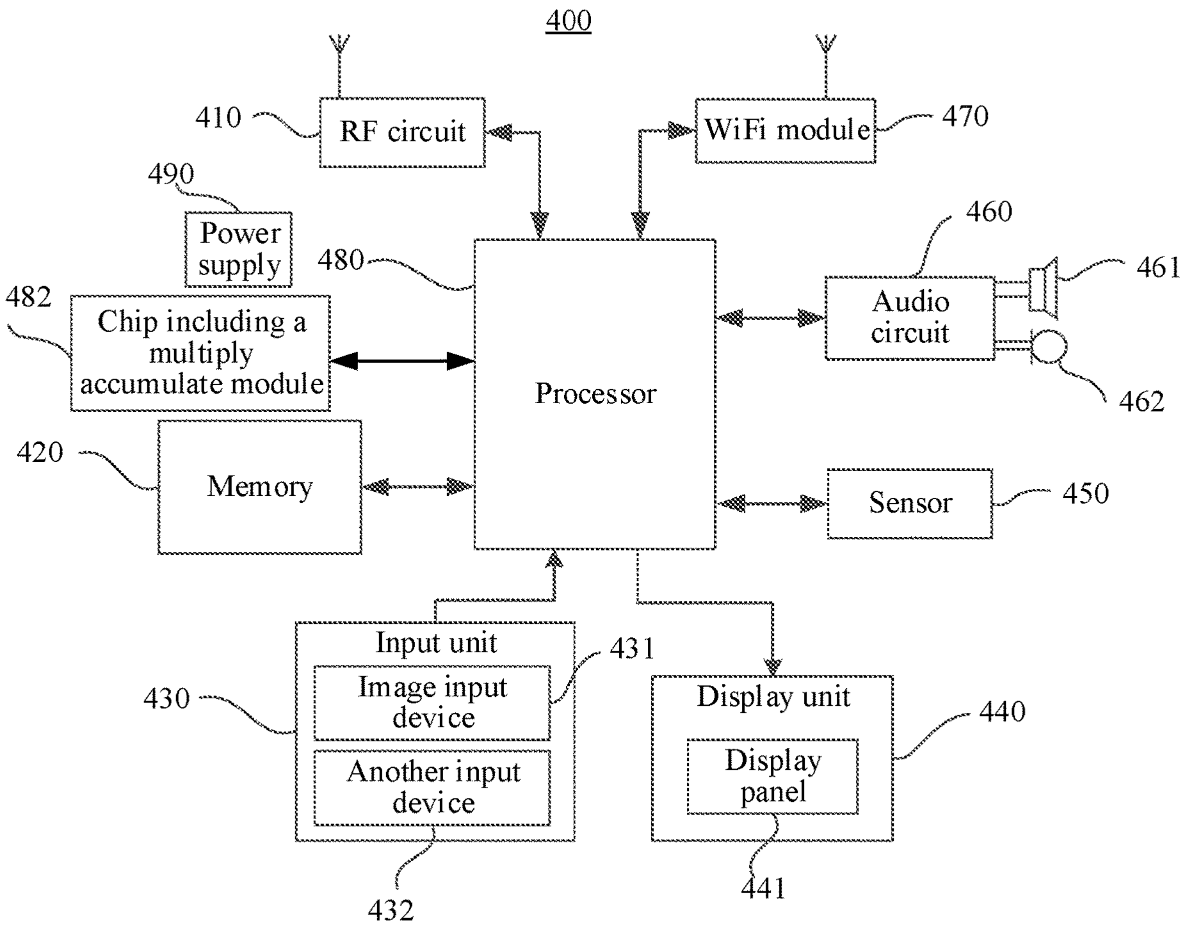
FIG. 22 is a schematic structural diagram of an electronic device according to an exemplary embodiment of this disclosure.

FIG. 22 is a schematic structural diagram of an electronic device according to an embodiment of this disclosure. The electronic device is configured to implement the floating-point operation control method provided in the foregoing embodiment. The electronic device includes at least one of a smartphone, a server, an Internet of Things (IoT) device, a cloud server, and an edge-side device.

An electronic device 400 may include components such as a radio frequency (RF) circuit 410, a memory 420 including one or more non-transitory computer readable storage media, an input unit 430, a display unit 440, a sensor 450, an audio circuit 460, a WiFi module 470, a processor 480 (e.g., processing circuitry) including one or more processing cores, and a power supply 490. A person skilled in the art may understand that the electronic device structure shown in FIG. 22 does not constitute a limitation to the electronic device. The electronic device may include more or fewer components than those shown in the figure, or some components may be combined, or a different component deployment may be used.

The input unit 430 may be configured to receive input digit or character information, and generate a keyboard, mouse, joystick, optical, or track ball signal input related to user setting and function control. Specifically, the input unit 430 may include an image input device 431 and another input device 432.

The display unit 440 may be configured to display information input by the user or information provided for the user, and various graphical user interfaces of the electronic device 400. The graphical user interfaces may be formed by a graph, a text, an icon, a video, and any combination thereof. The display unit 440 may include a display panel 441.

The audio circuit 460, a speaker 461, and a microphone 462 may provide audio interfaces between the user and the electronic device 400.

The electronic device 400 further includes a chip 482 including a multiply accumulator shown in any one of FIG. 1 to FIG. 20. The chip 482 including a multiply accumulator may implement the floating-point operation control method provided in the foregoing embodiment. FIG. 22 is a connection manner of the chip 482 including a multiply accumulator in the electronic device 400. However, a connection method of the chip 482 including a multiply accumulator in the electronic device 400 is not limited to the foregoing method, but the chip may be adaptively connected according to a function that needs to be implemented. For example, when the chip 482 including a multiply accumulator needs to complete image processing, the chip 482 may be directly connected to an image input device 431.

Although not shown in the figure, the electronic device 400 may further include a Bluetooth module and the like, and details are not described herein again.

Figure 23:
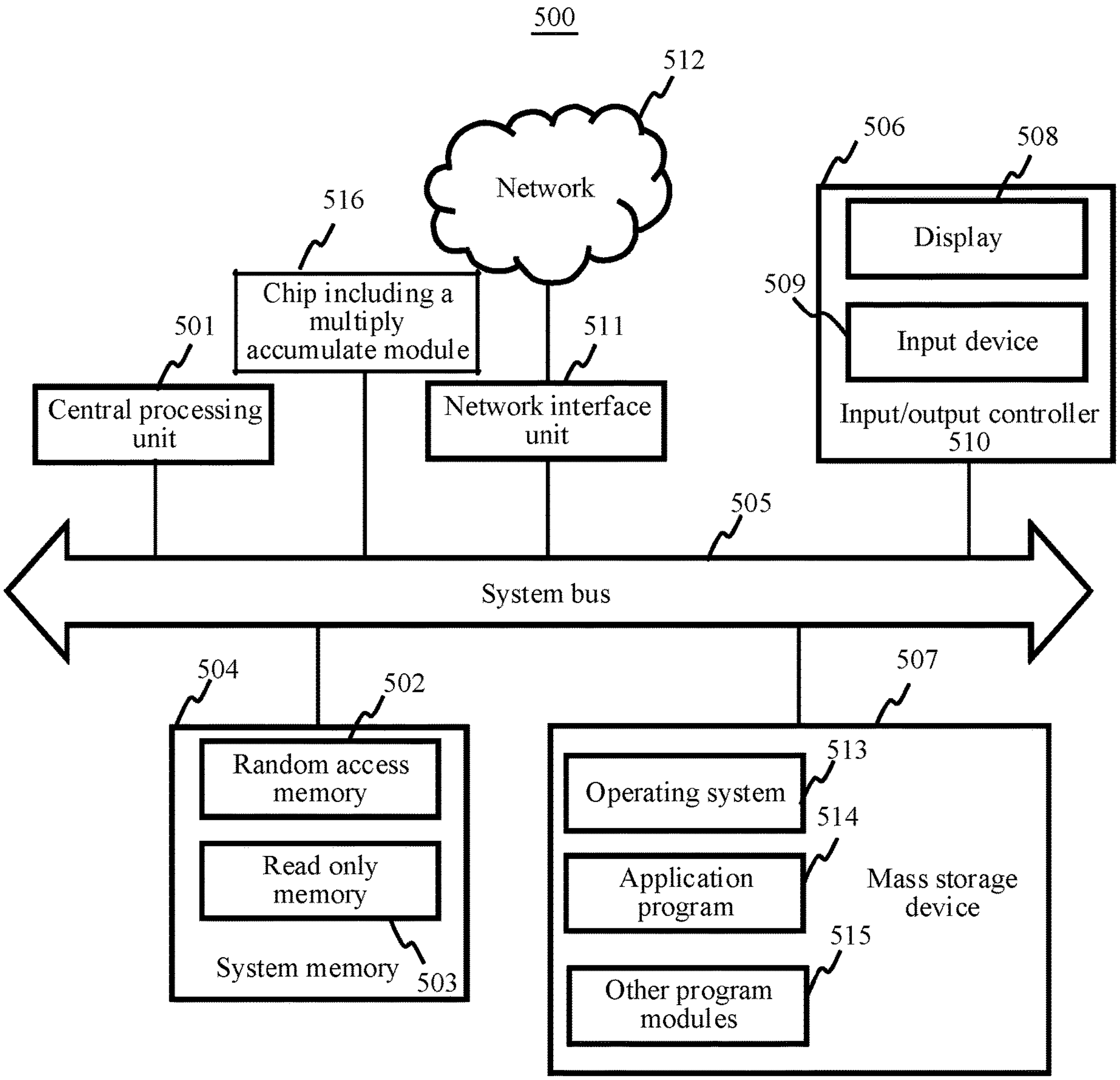
FIG. 23 is a schematic structural diagram of a server according to an exemplary embodiment of this disclosure.

FIG. 23 is a schematic structural diagram of a server according to an embodiment of this disclosure. The server is configured to implement the floating-point operation control method provided in the foregoing embodiment. Specifically, the server 500 includes a central processing unit (CPU) 501, a system memory 504 including a random access memory (RAM) 502 and a read-only memory (ROM) 503, and a system bus 505 for connecting the system memory 504 to the CPU 501. The server 500 also includes a basic input/output (I/O) system 506 that helps transfer information between various devices in a computer, and a mass storage device 507 used for storing an operating system 513, an application 514 and other program modules 515.

The basic input/output system 506 includes a display 508 configured to display information and an input device 509 such as a mouse and a keyboard for a user to input information. The display 508 and the input device 509 are both connected to the central processing unit 501 through an input/output controller 510 connected to the system bus 505. The mass storage device 507 is connected to the CPU 501 through a mass storage controller (not shown) connected to the system bus 505. The mass storage device 507 and its associated computer-readable media provide non-volatile storage for the server 500. That is, the mass storage device 507 may include a computer-readable medium (not shown) such as a hard disk or a compact disc read-only memory (CD-ROM) drive.

According to various embodiments of this disclosure, the server 500 may also be run by a remote computer connected to a network through a network such as the Internet. That is, the server 500 can be connected to a network 512 through a network interface unit 511 connected to the system bus 505, or can also be connected to other types of networks or a remote computer system (not shown) through the network interface unit 511.

The server 500 further includes a chip 516 including a multiply accumulator as shown in any one of FIG. 1 to FIG. 20, and the chip 516 is connected to another module in the server 500 by using a system bus. The chip 516 including a multiply accumulator may implement the floating-point operation control method provided in the foregoing embodiment.

In addition, an embodiment of this disclosure further provides a storage medium, where the storage medium is configured to store a computer program, and the computer program is configured to perform the floating-point operation control method provided in the foregoing embodiment.

An embodiment of this disclosure further provides a computer program product including instructions, when run on a computer, causing the computer to perform the floating-point operation control method provided in the foregoing embodiment.

The sequence numbers of the foregoing embodiments of this disclosure are merely for description purpose, and are not intended to indicate the preference among the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A chip comprising:

a multiply accumulator that includes:

an operand input;

a first selection input;

a floating-point general-purpose processing circuitry coupled to the operand input and the first selection input; and an output circuitry coupled to the floating-point general-purpose processing circuitry, wherein the floating-point general-purpose processing circuitry is configured to receive a first operand, a second operand, and a third operand through the operand input, each of the first operand, the second operand, and the third operand having a first bit width $k_1$;

divide a first fractional part of the first operand into m first suboperands of a second bit width $k_2$ based on a floating-point operation mode indicated by an input mode selection value from the first selection input, and divide a second fractional part of the second operand into m second suboperands of the second bit width $k_2$, the second bit width $k_2=k_1/m$, and m being a positive integer;

perform a multiplication operation of the first fractional part and the second fractional part based on the m first suboperands and the m second suboperands to obtain a fractional product;

determine a floating-point number product of the first operand and the second operand based on a sign bit and an exponent part of the first operand, a sign bit and an exponent part of the second operand, and the fractional product; and perform an addition operation on the floating-point number product and the third operand to obtain a floating-point number sum, the output circuitry is configured to output an operation result in a specified data format according to the floating-point number sum from the floating-point general-purpose processing circuitry, the floating-point general-purpose processing circuitry includes a multiplication array and an addition array, the multiplication array includes $m^2$ multipliers configured based on the input mode selection value, and is configured to multiply the m first suboperands by the m second suboperands through the $m^2$ multipliers to obtain $m^2$ intermediate fractional products, and the addition array includes a plurality of adders configured based on m, and is configured to obtain the fractional product based on the $m^2$ intermediate fractional products through the plurality of adders.

2. The chip according to claim 1, wherein the floating-point general-purpose processing circuitry includes a data extraction circuitry electrically coupled to the operand input and the first selection input; and the data extraction circuitry is configured to determine the floating-point operation mode based on the input mode selection value from the first selection input;

perform division from a lower order of the first fractional part of the first operand based on the second bit width $k_2$ to obtain the m first suboperands; and perform division from a lower order of the second fractional part of the second operand based on the second bit width $k_2$ to obtain the m second suboperands.

3. The chip according to claim 1, wherein a fractional part of a floating-point number of the first bit width $k_1$ supported by the floating-point operation mode corresponds to a bit width $N_1$, and a minimum bit width of a fractional part of an operand supported by the multiply accumulator corresponds to a bit width $N_2$;

a remainder of $N_1$ divided by m is calculated, and a difference obtained by subtracting the remainder from m is determined as a first parameter $P_1$;

a quotient value of a sum of $N_1$ and $P_1$ divided by m is calculated, and a difference obtained by subtracting $N_2$ from the quotient value is determined as a second parameter $P_2$; and based on that both $P_1$ and $P_2$ are non-negative integers, m is determined as a split quantity corresponding to the floating-point number of the first bit width $k_1$.

4. The chip according to claim 2, wherein the floating-point general-purpose processing circuitry includes a first operation circuitry, a first mapping circuitry, a second operation circuitry, and a second mapping circuitry;

the first operation circuitry includes the multiplication array and the addition array, and an input of the first operation circuitry is connected to an output of the data extraction circuitry;

an input of the first mapping circuitry is connected to an output of the first operation circuitry, and an output of the first mapping circuitry is connected to the second operation circuitry;

an input of the second operation circuitry is connected to the output of the data extraction circuitry, and an output of the second operation circuitry is connected to an input of the second mapping circuitry;

an output of the second mapping circuitry is connected to the input of the output circuitry;

the first mapping circuitry is configured to map the fractional product to a register according to a first specified format;

the second operation circuitry is configured to:

read the fractional product of the first specified format from the register, extend and generate a first intermediate result of a second specified format for the fractional product of the first specified format based on the sign bit and the exponent part of the first operand and the sign bit and the exponent part of the second operand, and extend and generate a second intermediate result of the second specified format for a fractional part of the third operand based on a sign bit and an exponent part of the third operand; and the second mapping circuitry is configured to add the first intermediate result and the second intermediate result to obtain the floating-point number sum.

5. The chip according to claim 4, wherein the second mapping circuitry includes K basic operation circuits, two adjacent basic operation circuits are connected in a cascading manner, and K is a positive integer; and the second mapping circuitry is configured to:

decompose the first intermediate result into K first numerical parts, decompose the second intermediate result into K second numerical parts, generate K signal values corresponding to the K first numerical parts and the K second numerical parts, a $t^{th}$ signal value indicating a connection relationship between a $t^{th}$ basic operation circuit and a $(t+1)^{th}$ basic operation circuit, and t being a positive integer less than or equal to K, map the K first numerical parts and the K second numerical parts to K storage units of the register according to a correspondence between numerical locations and operation bit widths, to obtain K groups of numerical parts in the K storage units, read the K groups of numerical parts into the K basic operation circuits, and correspondingly input the K signal values into the K basic operation circuits; and perform superposition and combination on the K groups of numerical parts by using the K basic operation circuits, to obtain the floating-point number sum.

6. The chip according to claim 5, wherein an operation bit width supported by each of the basic operation circuits is L, and reserved space on the register is (S, T); and a quotient value of a difference between T and S divided by L is rounded up to obtain the K storage units on the register, S being one boundary coordinate of the reserved space, T being another boundary coordinate of the reserved space, and L, T, and S being positive integers.

7. The chip according to claim 6, wherein a bit width of an exponent part of an operand of the first bit width $k_1$ is e, the fractional product of the first specified format includes an integer part I' and a fractional part M', and a location offset value of the fractional product of the first operand and the second operand in the register is Offset; and 1 is subtracted from a sum of $2^{e-1}$, I', and Offset to obtain S, and a difference obtained by subtracting a sum of $2^{e-1}$ and M' from a sum of Offset and 2 is calculated to obtain the reserved space (S, T).

8. The chip according to claim 4, wherein the fractional product includes an original integer part and an original fractional part; and the first mapping circuitry is configured to cut the original integer part according to an integer cutting bit width to obtain a cut integer part;

cut the original fractional part according to a fractional cutting bit width, to obtain a cut fractional part; and map the cut integer part and the cut fractional part to coordinates of the register to obtain the fractional product of the first specified format.

9. The chip according to claim 1, wherein the floating-point number sum is in a fixed-point format, and the specified data format includes the fixed-point format or a floating-point format;

the multiply accumulator includes a second selection input; and the output circuitry is configured to output the floating-point number sum in the fixed-point format as the operation result based on the fixed-point format indicated by an output mode selection value from the second selection input; or convert the floating-point number sum in the fixed-point format into a floating-point number sum in the floating-point format based on the floating-point format indicated by the output mode selection value from the second selection input, and output the floating-point number sum in the floating-point format as the operation result.

10. A floating-point operation control method, the method comprising:

receiving an input mode selection value through a first selection input of a multiply accumulator;

receiving a first operand, a second operand, and a third operand through an operand input of the multiply accumulator, each of the first operand, the second operand, and the third operand having a first bit width $k_1$;

dividing, by floating-point general-purpose processing circuitry of the multiply accumulator, a first fractional part of the first operand into m first suboperands of a second bit width $k_2$ based on a floating-point operation mode indicated by the input mode selection value, and dividing a second fractional part of the second operand into m second suboperands of the second bit width $k_2$, the second bit width $k_2=k_1/m$, and m being a positive integer;

performing, by the floating-point general-purpose processing circuitry, a multiplication operation of the first fractional part and the second fractional part based on the m first suboperands and the m second suboperands to obtain a fractional product;

determining, by the floating-point general-purpose processing circuitry, a floating-point number product of the first operand and the second operand based on a sign bit and an exponent part of the first operand, a sign bit and an exponent part of the second operand, and the fractional product;

performing, by the floating-point general-purpose processing circuitry, an addition operation on the floating-point number product and the third operand to obtain a floating-point number sum; and outputting, by output circuitry of the multiply accumulator, an operation result in a specified data format according to the floating-point number sum, wherein the floating-point general-purpose processing circuitry includes a multiplication array and an addition array; and the performing the multiplication operation includes:

multiplying the m first suboperands by the m second suboperands, through $m^2$ multipliers of the multiplication array configured based on the input mode selection value, to obtain $m^2$ intermediate fractional products; and obtaining the fractional product based on the $m^2$ intermediate fractional products, through a plurality of adders of the addition array configured based on m.

11. The method according to claim 10, wherein the performing the addition operation on the floating-point number product and the third operand to obtain the floating-point number sum comprises:

mapping the fractional product to a register according to a first specified format;

reading the fractional product of the first specified format from the register;

extending and generating a first intermediate result of a second specified format for the fractional product of the first specified format based on the sign bit and the exponent part of the first operand and the sign bit and the exponent part of the second operand;

extending and generating a second intermediate result of the second specified format for a fractional part of the third operand based on a sign bit and an exponent part of the third operand; and adding the first intermediate result and the second intermediate result to obtain the floating-point number sum.

12. The method according to claim 11, wherein the multiply accumulator includes K basic operation circuits, two adjacent basic operation circuits are connected in a cascading manner, and K is a positive integer; and the adding includes:

decomposing the first intermediate result into K first numerical parts, decomposing the second intermediate result into K second numerical parts, generating K signal values corresponding to the K first numerical parts and the K second numerical parts, a $t^{th}$ signal value indicating a connection relationship between a $t^{th}$ basic operation circuit and a $(t+1)^{th}$ basic operation circuit, and t being a positive integer less than or equal to K, mapping the K first numerical parts and the K second numerical parts to K storage units of the register according to a correspondence between numerical locations and operation bit widths, to obtain K groups of numerical parts in the K storage units, reading the K groups of numerical parts into the K basic operation circuits, and correspondingly inputting the K signal values into the K basic operation circuits, and performing superposition and combination on the K groups of numerical parts by using the K basic operation circuits, to obtain the floating-point number sum.

13. The method according to claim 12, wherein an operation bit width supported by each of the basic operation circuits is L, and reserved space on the register is (S, T); and a quotient value of a difference between T and S divided by L is rounded up to obtain the K storage units on the register, S being one boundary coordinate of the reserved space, T being another boundary coordinate of the reserved space, and L, T, and S being positive integers.

14. The method according to claim 11, wherein the fractional product includes an original integer part and an original fractional part; and the mapping includes:

cutting the original integer part according to an integer cutting bit width to obtain a cut integer part;

cutting the original fractional part according to a fractional cutting bit width, to obtain a cut fractional part; and mapping the cut integer part and the cut fractional part to coordinates of the register to obtain the fractional product of the first specified format.

15. The method according to claim 10, wherein the floating-point number sum is in a fixed-point format, and the specified data format includes the fixed-point format or a floating-point format; and the outputting includes:

receiving an output mode selection value from a second selection input of the multiply accumulator; and at least one of outputting the floating-point number sum in the fixed-point format as the operation result based on the fixed-point format indicated by an output mode selection value from the second selection input; or converting the floating-point number sum in the fixed-point format into a floating-point number sum in the floating-point format based on the floating-point format indicated by the output mode selection value from the second selection input, and outputting the floating-point number sum in the floating-point format as the operation result.

16. The method according to claim 10, further comprising:

determining a floating-point operation mode based on the input mode selection value from the first selection input;

performing division from a lower order of the first fractional part of the first operand based on the second bit width $k_2$ to obtain the m first suboperands; and performing division from a lower order of the second fractional part of the second operand based on the second bit width $k_2$ to obtain the m second suboperands.

17. The method according to claim 10, wherein a fractional part of a floating-point number of the first bit width $k_1$ supported by the floating-point operation mode corresponds to a bit width $N_1$, and a minimum bit width of a fractional part of an operand supported by the multiply accumulator corresponds to a bit width $N_2$; and the method further includes calculating a remainder of $N_1$ divided by m, and determining as a first parameter $P_1$ a difference obtained by subtracting the remainder from m;

calculating a quotient value of a sum of $N_1$ and $P_1$ divided by m, and determining as a second parameter $P_2$ a difference obtained by subtracting $N_2$ from the quotient value; and based on a determination that both $P_1$ and $P_2$ are non-negative integers, determining m as a split quantity corresponding to the floating-point number of the first bit width $k_1$.

18. A non-transitory computer-readable storage medium storing computer-readable instructions thereon, which, when executed by a chip, cause the chip to perform a floating-point operation control method comprising:

receiving an input mode selection value through a first selection input of a multiply accumulator of the chip;

receiving a first operand, a second operand, and a third operand through an operand input of the multiply accumulator, each of the first operand, the second operand, and the third operand having a first bit width $k_1$;

dividing, by floating-point general-purpose processing circuitry of the multiply accumulator, a first fractional part of the first operand into m first suboperands of a second bit width $k_2$ based on a floating-point operation mode indicated by the input mode selection value, and dividing a second fractional part of the second operand into m second suboperands of the second bit width $k_2$, the second bit width $k_2=k_1/m$, and m being a positive integer;

performing, by the floating-point general-purpose processing circuitry, a multiplication operation of the first fractional part and the second fractional part based on the m first suboperands and the m second suboperands to obtain a fractional product;

determining, by the floating-point general-purpose processing circuitry, a floating-point number product of the first operand and the second operand based on a sign bit and an exponent part of the first operand, a sign bit and an exponent part of the second operand, and the fractional product;

performing, by the floating-point general-purpose processing circuitry, an addition operation on the floating-point number product and the third operand to obtain a floating-point number sum; and outputting, by output circuitry of the multiply accumulator, an operation result in a specified data format according to the floating-point number sum, wherein the floating-point general-purpose processing circuitry includes a multiplication array and an addition array; and the performing the multiplication operation includes:

multiplying the m first suboperands by the m second suboperands, through $m^2$ multipliers of the multiplication array configured based on the input mode selection value, to obtain $m^2$ intermediate fractional products; and obtaining the fractional product based on the $m^2$ intermediate fractional products, through a plurality of adders of the addition array configured based on m.

19. The non-transitory computer-readable storage medium according to claim 18, wherein the performing the addition operation on the floating-point number product and the third operand to obtain the floating-point number sum comprises:

mapping the fractional product to a register according to a first specified format;

reading the fractional product of the first specified format from the register;

extending and generating a first intermediate result of a second specified format for the fractional product of the first specified format based on the sign bit and the exponent part of the first operand and the sign bit and the exponent part of the second operand;

extending and generating a second intermediate result of the second specified format for a fractional part of the third operand based on a sign bit and an exponent part of the third operand; and adding the first intermediate result and the second intermediate result to obtain the floating-point number sum.

20. The non-transitory computer-readable storage medium according to claim 18, wherein the floating-point number sum is in a fixed-point format, and the specified data format includes the fixed-point format or a floating-point format; and the outputting includes:

receiving an output mode selection value from a second selection input of the multiply accumulator; and at least one of:

outputting the floating-point number sum in the fixed-point format as the operation result based on the fixed-point format indicated by an output mode selection value from the second selection input; or converting the floating-point number sum in the fixed-point format into a floating-point number sum in the floating-point format based on the floating-point format indicated by the output mode selection value from the second selection input, and outputting the floating-point number sum in the floating-point format as the operation result.

* * * * *